(12) United States Patent
Sasakura et al.

(10) Patent No.: US 8,218,944 B2
(45) Date of Patent: Jul. 10, 2012

(54) RECORDING/REPRODUCTION DEVICE

(75) Inventors: Shuhei Sasakura, Osaka (JP); Naoki Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 1561 days.

(21) Appl. No.: 11/628,665

(22) PCT Filed: May 6, 2005

(86) PCT No.: PCT/JP2005/008344
§ 371 (c)(1),
(2), (4) Date: Dec. 6, 2006

(87) PCT Pub. No.: WO2005/122167
PCT Pub. Date: Dec. 22, 2005

(65) Prior Publication Data
US 2008/0063380 A1    Mar. 13, 2008

(30) Foreign Application Priority Data

Jun. 8, 2004  (JP) ................. 2004-170418
Feb. 3, 2005  (JP) ................. 2005-028302

(51) Int. Cl.
*H04N 9/80*  (2006.01)
(52) U.S. Cl. ........................ 386/252
(58) Field of Classification Search ........... None
See application file for complete search history.

(56) References Cited

U.S. PATENT DOCUMENTS

| | | | | |
|---|---|---|---|---|
| 6,999,947 B2 * | 2/2006 | Utsumi et al. | ............. | 705/59 |
| 7,277,870 B2 * | 10/2007 | Mourad et al. | ............. | 705/51 |
| 7,567,671 B2 * | 7/2009 | Gupte | ............. | 380/239 |
| 2001/0021255 A1 | 9/2001 | Ishibashi | | |
| 2002/0036800 A1 * | 3/2002 | Nozaki et al. | ............. | 358/1.15 |
| 2002/0107595 A1 | 8/2002 | Abe et al. | | |
| 2002/0131594 A1 * | 9/2002 | Hori et al. | ............. | 380/201 |
| 2003/0023847 A1 | 1/2003 | Ishibashi et al. | | |
| 2003/0031319 A1 | 2/2003 | Abe et al. | | |

(Continued)

FOREIGN PATENT DOCUMENTS

EP    1 111 530    6/2001

(Continued)

OTHER PUBLICATIONS

Partial English translation of JP 2002-319270, Oct. 2002 (cited in International Search Report).

(Continued)

*Primary Examiner* — William C Vaughn, Jr.
*Assistant Examiner* — Gelek W Topgyal
(74) *Attorney, Agent, or Firm* — Wenderoth, Lind & Ponack, L.L.P.

(57) ABSTRACT

A recording/reproduction device that prevents content and related content from being reproduced simultaneously. The recording/reproducing device (110) includes a recording area (115), a communication processing unit (119) outputting the related content having details identical to details of the content recorded onto the recording area (115) into an external recording medium (160), and an encoding/decoding processing unit (117) obtaining unique information of the external recording medium (160). The encoding/decoding processing unit (117) changes a state of content recorded in the recording area (115) into an irreproducible state unless the unique information of the content is used, when the related content is outputted to the external recording medium (160), and then reproduces the content recorded in the recording area (115) using the unique information, when the encoding/decoding processing unit (117) obtains the unique information.

13 Claims, 11 Drawing Sheets

U.S. PATENT DOCUMENTS

| | | | |
|---|---|---|---|
| 2003/0086567 A1* | 5/2003 | Okamoto et al. | 380/201 |
| 2004/0010468 A1 | 1/2004 | Abe et al. | |
| 2004/0015713 A1 | 1/2004 | Abe et al. | |
| 2004/0015716 A1 | 1/2004 | Abe et al. | |
| 2004/0081044 A1 | 4/2004 | Sako et al. | |
| 2004/0117663 A1 | 6/2004 | Colvin | |
| 2004/0213555 A1* | 10/2004 | Nishimoto et al. | 386/95 |
| 2005/0086505 A1 | 4/2005 | Ishibashi | |
| 2005/0177745 A1* | 8/2005 | Oswald et al. | 713/201 |
| 2006/0066970 A1* | 3/2006 | Arai et al. | 360/8 |
| 2007/0230900 A1 | 10/2007 | Toriumi | |
| 2008/0063380 A1 | 3/2008 | Sasakura et al. | |

FOREIGN PATENT DOCUMENTS

| | | |
|---|---|---|
| EP | 1 266 753 | 12/2002 |
| JP | 10-241288 | 9/1998 |
| JP | 2000-011535 | 1/2000 |
| JP | 2000-293589 | 10/2000 |
| JP | 2001-128170 | 5/2001 |
| JP | 2001-209312 | 8/2001 |
| JP | 2001-243707 | 9/2001 |
| JP | 2002-175664 | 6/2002 |
| JP | 2002-319270 | 10/2002 |
| JP | 2002-366441 | 12/2002 |
| JP | 2002-368732 | 12/2002 |
| JP | 2002-373118 | 12/2002 |
| JP | 2002-373470 | 12/2002 |
| JP | 2003-044361 | 2/2003 |
| JP | 2003-244642 | 8/2003 |
| JP | 2003-272285 | 9/2003 |
| JP | 2003-526174 | 9/2003 |
| JP | 2003-339000 | 11/2003 |
| JP | 2005-6231 | 1/2005 |
| JP | 2005-303763 | 10/2005 |
| JP | 2005-353128 | 12/2005 |
| JP | 2006-50179 | 2/2006 |
| JP | 2006-528472 | 12/2006 |
| WO | 01/67668 | 9/2001 |
| WO | 2006/041202 A2 | 4/2006 |

OTHER PUBLICATIONS

Partial English translation of JP 2003-272285, Sep. 2003 (cited in International Search Report).

Supplementary European Search Report mailed Jan. 23, 2012 in corresponding European patent Application No. 05 73 7328.

* cited by examiner

FIG. 10

| Identical content confirming information | | |
|---|---|---|
| No. | Source data ID | External data ID |
| (1) | AN | B |
| (2) | CN | D |
| (3) | ⋮ | ⋮ |
| ⋮ | ⋮ | ⋮ |

RECORDING/REPRODUCTION DEVICE

TECHNICAL FIELD

The present invention relates to a recording and reproduction device which records and reproduces content.

BACKGROUND ART

In recent years, information terminal devices (hereinafter referred to as portable terminal devices) such as cellular phones, and Personal Digital Assistants (PDAs), which can be easily carried with, are widely available on the market. A portable terminal device includes a unit to pass information to a user visually using a small liquid crystal screen or the like, and a unit to pass information to a user aurally through a speaker, earphones, or the like. As a recording medium for such portable terminal devices, a universal memory card (e.g. IC card including SD Card™ and Memory Stick™), which includes nonvolatile memories such as a flash memory, has been widespread. Digital content, including video and audio, is stored into the memory card, and is viewed using a portable terminal device.

In Japan, terrestrial digital broadcast has made a full-fledged start, and content with high image quality has come to be digitally distributed. The proliferation of apparatuses such as hard disk recorders and Digital Versatile Disk (DVD) recorders, with which digital signals can be directly recorded, has facilitated the distributed content to be recorded easily in digital signal format. Patent Reference 1 discloses a copyright protection method using a hard disk and a memory card. The method prevents the unauthorized use of content by encoding and recording content into a hard disk and storing a key required for decoding into an area in which the security of a memory card is ensured.

Following the digitalization of content, various mechanisms to protect the rights of copyright holders have been proposed. One of these mechanisms is a rule called "copy-once". Under this rule, the recorded digital content is authorized to be copied only once, and additional copying is not authorized. For example, the digital broadcast signal, to which a copy-once identifier is added, is not authorized to be copied on another medium, when being recorded on a recorder such as a hard disk recorder, a DVD recorder or the like. In the case where content is recorded on another medium, original content must be deleted. Provided that content is deleted, the recording of content onto another medium is called "move".

Since the main application of stationary recorders such as hard disk recorders and DVD recorders is to be installed for home-use, content is required to be recorded and reproduced in high image quality as well as in high sound quality. Thus, storage devices with large storage capacity such as a hard disk and a DVD are used in the stationary recorders. A format capable of processing content in high image quality as well as in high sound quality is adopted for such content. The bit rate for such content is generally high.

On the other hand, it is assumed that portable terminal devices are carried with when being used, and reproduce content stored in a recording media such as a memory card or the like. Thus, a portable terminal device is required to display content on a relatively small display device, to be powered by a battery, and to be implemented with low power consumption. Thus, as a format for content to be recorded onto a portable terminal device, a format with a low-image quality and/or a low-sound quality is adopted. In other words, the bit rate of content is generally low.

Under the copy-once rule for example, when content of digital TV broadcast and the like is recorded, up to two pieces of such content can be stored in different recording media simultaneously. By utilizing the copy-once rule, content can be stored into a hard disk drive (HDD), a DVD and the like, having large-capacity as well as high-accuracy, and simultaneously into a memory card having small-capacity and low-accuracy.

Patent Reference 1: Japanese Open-Laid Patent Application No. 2002-368732

DISCLOSURE OF INVENTION

Problems that Invention is to Solve

However, a user usually stores a large amount of content into a large-capacity HDD, and then "moves" desired content into a memory card to use the content outside the home. In this case, since the rule of move is applied, the content in the HDD must be deleted. In the case where content is moved to a memory card, the content is usually recorded onto the memory card having a lower bit rate compared to the case being recorded on an HDD. As such, even if the content is moved back to the HDD, the original high bit rate content can not be reconstructed. Thus, even if a user wants to enjoy viewing the content after using the content outside the home, it is impossible for the user to enjoy viewing the content in high image quality and high sound quality.

In consideration of the problem stated above, an object of the present invention is to provide a recording and reproduction device capable of preventing reproducing the content having details identical to an outputted content simultaneously with the outputted content, and capable of reproducing the content with high quality when reproducing the content.

Means to Solve the Problems

To attain the aforementioned object, a recording and reproduction device of the present invention includes: a recording unit which records content onto a first recording medium; an output unit which outputs related content into a second recording medium, the related content including details identical to details of the content recorded on the first recording medium; a unique information obtaining unit which obtains unique information of the second recording medium; a first state changing unit which changes a state of the content recorded on the first recording medium into a state, in which the content is irreproducible unless the unique information of the second recording medium is used, by using the unique information of the second recording medium, in the case where the output unit outputs the related content into the second recording medium; and a reproduction unit which reproduces the content recorded on the first recording medium, the content having been changed into the irreproducible state, by using the unique information of the second recording medium, in the case where the unique information obtaining unit obtains the unique information of the second recording medium after the first state changing unit has changed the state of the content recorded on the first recording medium into the irreproducible state.

Thus, the recording and reproduction device according to the present invention changes a state of the content recorded on the first recording medium into a state, in which the content is irreproducible unless using the unique information of the second recording medium by using the unique information of the second recording medium. In addition, when obtaining the unique information after changing the state, the recording and reproduction device of the present invention reproduces the content recorded on the first recording medium with a state, which has been changed into an irreproducible state, by using the unique information. The recording and reproduction device of the present invention is thus capable of preventing reproduction of the content having details identical to the details of an outputted content simultaneously with the outputted content, and capable of reproducing the content with high quality when reproducing the content.

The present invention can be realized as a recording and reproduction method having constituent units unique to the recording and reproduction device of the present invention as steps, and also as a program to allow a computer to execute these steps. The program is distributable via a recording medium such as a CD-ROM or the like, and a transmission medium such as a communication network or the like.

Effects of the Invention

The present invention can provide a recording and reproduction device capable of preventing reproduction of the content having details identical to the details of an outputted content simultaneously with the outputted content, and capable of reproducing the content with high quality when reproducing the content.

In other words, in the present invention, since there is always single content which is reproducible, the rule of the move is honored. In other words, the present invention can help protect the rights of the copyright holders against unauthorized copying.

Moreover, the recording and reproduction device of the present invention is capable of preventing reproduction of the content having details identical to the details of an outputted content simultaneously with the outputted content, and capable of reproducing the content with high quality when reproducing the content. This is far more beneficial to a user.

BRIEF DESCRIPTION OF DRAWINGS

FIG. 10 is a diagram showing an example of the identical content confirming information.

NUMERICAL REFERENCES

Figure 1:
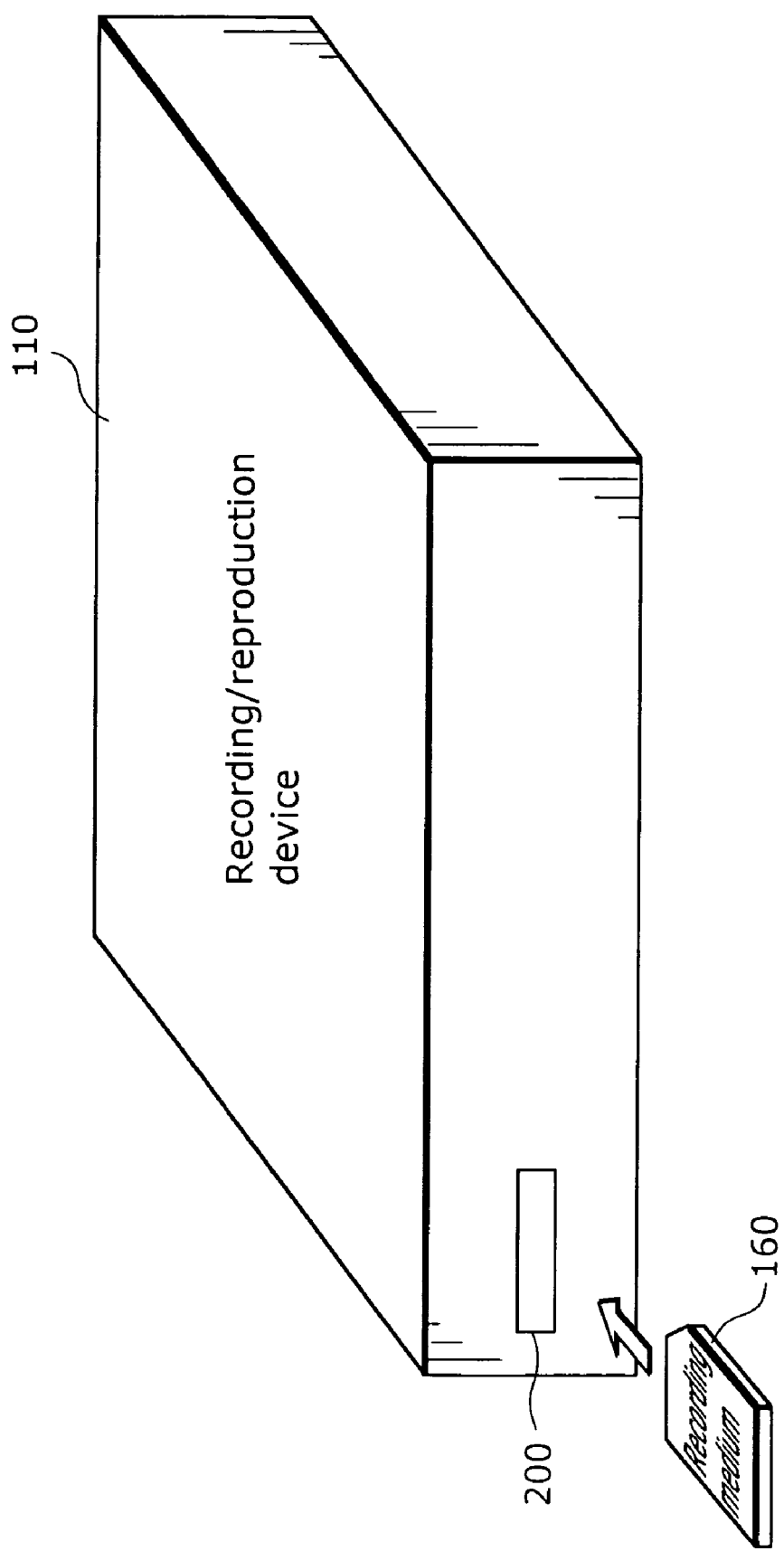
FIG. 1 is a diagram showing an appearance of a recording/reproduction device 110 and an external recording medium 160 according to an embodiment.

110 Recording/reproduction device
111 Tuner
112 Demodulator
113 TS decoder
114 Compression/decompression unit
115 Recording area (in recording/reproduction device)
116 Reproduction processing unit
117 Encoding/decoding processing unit
118 ROM area (in recording/reproduction device)
119 Communication processing unit (in recording/reproduction device)
130 Display device
131 Speaker
141 Clock line
142 Command/response line
143 Data line
144 Data line
145 Data line
146 Power supply line
163 External recording medium
161 Communication control unit (in external recording medium)
162 Card control unit
163 Recording area (in external recording medium)
164 ROM area (in external recording medium)

BEST MODE FOR CARRYING OUT THE INVENTION

The best mode for carrying out the present invention is explained blow referring to diagrams.

First Embodiment

Figure 2:
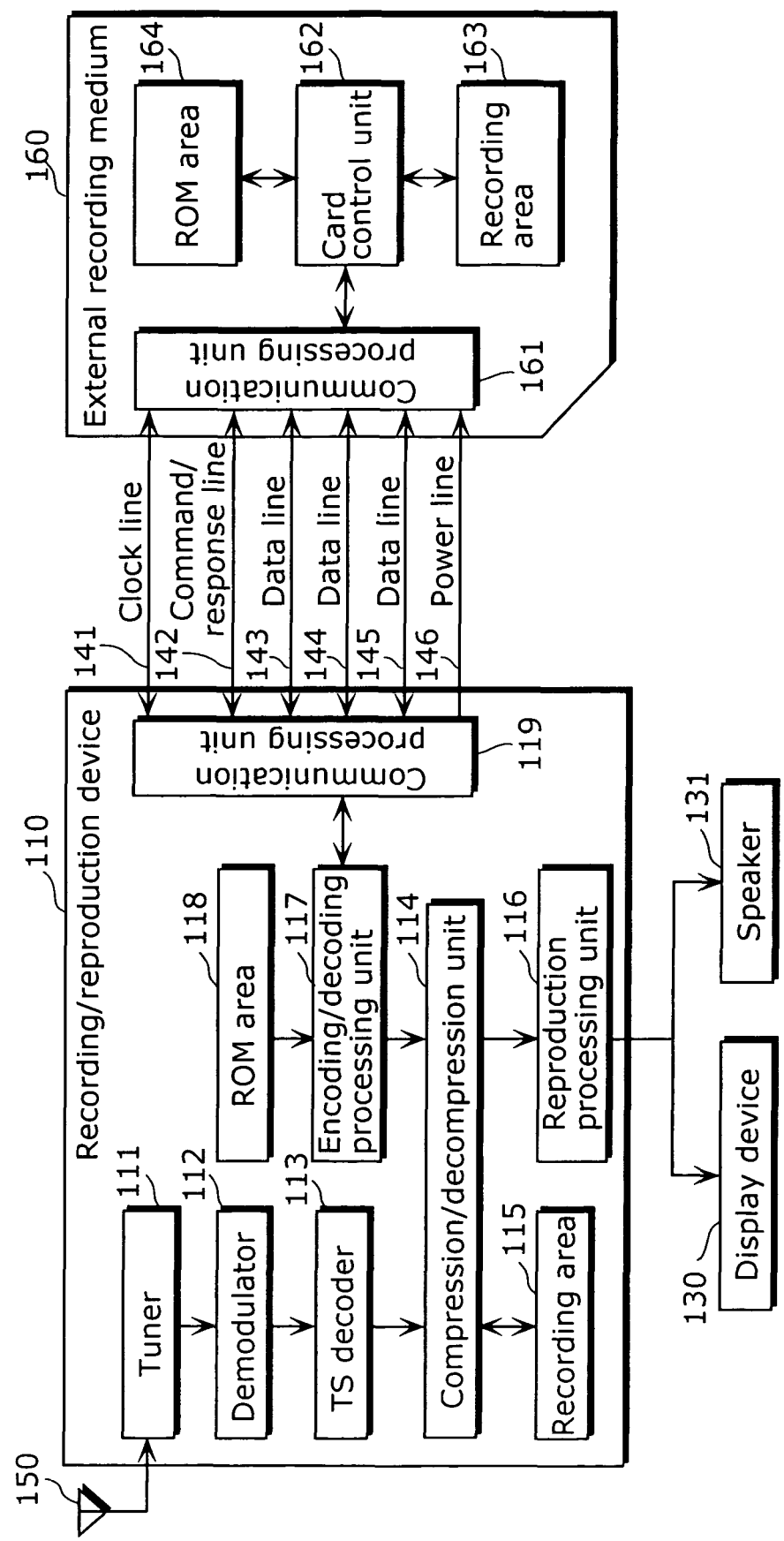
FIG. 2 is a block diagram showing a configuration of the recording/reproduction device 110 and the external recording medium 160 according to the embodiment.

First, the configurations of a recording/reproduction device 110 and an external recording medium 160 according to the first embodiment are explained using FIG. 1 and FIG. 2 herein.

FIG. 1 is a diagram showing an appearance of the recording/reproduction device 110 and the external recording medium 160 according to the first embodiment. The recording/reproduction device 110 is a recording and reproduction device, such as a hard disk recorder and a DVD recorder. The external recording medium 160 is an example of the second recording medium, and is a memory card, including a semiconductor memory. The recording/reproduction device 110 includes a slot 200, into which the external recording medium 160 is inserted.

FIG. 2 is a block diagram showing the configurations of the recording/reproduction device 110 and the external recording medium 160 according to the first embodiment. A connector (not shown in FIG. 2), which is placed in the slot 200 (not shown in FIG. 2) of the recording/reproduction device 110, is connected to the external recording medium 160 included in the slot 200. Via this connector, the recording/reproduction device 110 outputs power, a control command, data and the like into the external recording medium 160, and the external recording medium 160 outputs a response, data and the like into the recording/reproduction device 110. In the first embodiment, the recording/reproduction device 110 is a stationary hard disk recorder. The recording/reproduction device 110 processes the digital TV broadcast signal received by an antenna 150, and outputs video and audio from a display device 130 and a speaker 131.

The recording/reproduction device 110 may be other devices (e.g. a PC, a DVD recorder, a DVHS recorder, and a recorder using a next-generation disk). The external recording medium 160 may be a small-type HDD and the like. When transmitting a control command, a response, and data between the recording/reproduction device 110 and the external recording medium 160, however, the recording/reproduction device 110 must authorize the external recording medium 160 in accordance with a predetermined standard for connection, and all communications on the communication line must be transmitted by a route secured through encoding and the like so that the communication is protected from being forged and stolen.

The recording/reproduction device 110 includes a tuner 111, a demodulator 112, a TS decoder 113, a compression/decompression unit 114, a recording area 115, a reproduction processing unit 116, an encoding/decoding processing unit 117, a ROM area 118, and a communication processing unit 119. A display device 130 and a speaker 131 are connected to the reproduction processing unit 116.

The external recording medium 160 includes a communication processing unit 161, a card control unit 162, a recording area 163, and a ROM area 164.

The recording/reproduction device 110 is connected to the external recording medium 160 with a clock line 141, a command/response line 142, data lines 143, 144 and 145, a power supply line 146, and a ground line (not shown in diagrams). The clock line 141, command/response line 142, and data lines 143, 144 and 145 are buses for executing communication between the communication processing unit 119 and the communication processing unit 161. The power supply line 146, which supplies power from the recording/reproduction device 110 into the external recording medium 160, and the ground line (not shown in diagrams) are a part of the connecting lines connecting the recording/reproduction device 110 and external recording medium 160. The external recording medium 160 is activated by power supplied from the recording/reproduction device 110.

The recording/reproduction device 110 and the external recording medium 160 perform communication in the master/slave communication system, in which the recording/reproduction device 110 is the master and the external recording medium 160 is the slave. The recording/reproduction device 110 is capable of transmitting command via the command/response line 142, and data via the command/response line 142 or data lines 143, 144 and 145 to the external recording medium 160. The recording/reproduction device 110 transmits a clock to the external recording medium 160 via the clock line 141, when transmitting a command or data and receiving a response or data. This clock is generated based on an output signal of a built-in transmitter (not shown in diagrams) in the recording/reproduction device 110.

The external recording medium 160 transmits a response for the command transmitted from the recording/reproduction device 110 via the command/response line 142 to the recording/reproduction device 110. The external recording medium 160 transmits data via the command/response line 142 or data lines 143, 144, and 145 to the recording/reproduction device 110. The aforementioned response or data is transmitted via the clock line 141 in synchronization with the clock transmitted from the recording/reproduction device 110.

Next, the function of each configuration unit of the external recording medium 160 is explained below. The card control unit 162 analyzes the command received by the communication processing unit 161 from the recording/reproduction device 110, and controls each configuration unit of the external recording medium 160 based on the analysis result. Moreover, the card control unit 162 is capable of allowing the communication processing unit 161 to transmit the processing result of the received command to the recording/reproduction device 110 as a response. In addition, the card control unit 162 is capable of recording data received by the communication processing unit 161 via the data lines 143, 144, and 145 into the recording area 163, and allowing the communication processing unit 161 to transmit the data recorded in the recording area 163 via the data lines 143, 144, and 145 to the recording/reproduction device 110, in accordance with a request of the recording/reproduction device 110.

In the ROM area 164, unique information of the external recording medium 160 is recorded. The unique information is information unique to the external recording medium 160, and there is no other external recording mediums having information identical to this unique information. The unique information can be read-out but cannot be rewritten.

The communication processing unit 161 records and stores the data received from the recording/reproduction device 110 in accordance with an instruction of the card control unit 162 into the recording area 163. In the case where a request for reading out the data stored in the recording area 163 is issued by the recording/reproduction device 110, the data stored in the recording area 163 is transmitted via the communication processing unit 161 to the recording/reproduction device 110 under the control of the card control unit 162. In the case where a request for altering or deleting the data stored in the recording area 163 is issued by the recording/reproduction device 110, the data stored in the recording area 163 is altered or deleted under the control of the card control unit 162. In the first embodiment, the recording area 163 is a semiconductor memory such as a flash memory or the like.

Next, each function of the configuration units of the recording/reproduction device 110 is explained below.

The antenna 150 receives the digital broadcast signal (a digital data stream) including compressed video data and audio data transmitted from a broadcast station.

The tuner 111 retrieves a broadcast signal of a channel specified by a user out of broadcast signals received by all channels via the antenna 150 (one broadcast signal extracted out of multiplexed broadcast signals in a specific frequency). The demodulator 112 demodulates the digital broadcast signal retrieved by the tuner 111 into a base band signal, generates a transport stream (hereinafter referred to as TS), and outputs it into the TS decoder 113.

The TS decoder 113 decodes the TS. Since the digital broadcast signal, which is transmitted from the broadcast station, includes a valid packet and an invalid packet, the TS decoder 113 creates the content compressed data A omitting the invalid packet. The video data and audio data included in the terrestrial digital broadcast signal are compressed, encoded for error-correction, and scrambled. The TS decoder 113 de-scrambles the received video data and audio data, and encodes them for error-correction. The TS decoder 113 transmits the created content compressed data A to the compression/decompression unit 114. In the first embodiment, the digital signal stream received by the recording/reproduction device 110 is an MPEG2-TS type stream.

The recording area 115 is an area capable of storing the received content and the content control information for controlling the content. In the recording area 115, data is read and compiled as necessary. In the first embodiment, the recording area 115 is a hard disk drive. The recording area 115 stores the content received from the compression/decompression unit 114 and the content control information, and outputs the stored content into the compression/decompression unit 114, when a request for reading out the content is issued. Note that the recording area 115 is an example of a recording unit and the first recording medium.

The reproduction processing unit 116 receives content and outputs the content as a digital signal or an analog signal. In other words, the reproduction processing unit 116 outputs video data into the display device 130 and audio data into the speaker 131.

The compression/decompression unit 114 receives content from the TS decoder 113, recording area 115, or encoding/decoding processing unit 117, and outputs the content into the recording area 115, reproduction processing unit 116, or encoding/decoding processing unit 117.

(1) In the case where the compression/decompression unit 114 outputs the content compressed data A received from the TS decoder 113 into the recording area 115, the received content compressed data A is outputted directly or after being decompressed to be converted into another storage form and recompressed. Moreover, (2) in the case where the compression/decompression unit 114 outputs the content compressed data A received from the TS decoder 113 into the reproduction processing unit 116, the received content compressed data A is outputted after being decompressed in to non-compressed data. Further, (3) in the case where the compression/decompression unit 114 outputs the content compressed data A received from the recording area 115 into the reproduction processing unit 116, the received content compressed data A is outputted after being decompressed and converted into non-compressed data. Furthermore, (4) in the case where the compression/decompression unit 114 outputs the content received from the recording area 115 into the encoding/decoding processing unit 117, the content is undergone another form of compression processing and outputted into the encoding/decoding processing unit 117 after being decompressed. Another form of compression processing is a form for storing content into the external recording medium 160 after degrading the content quality with the aim of reproducing the content by a portable terminal device and the like, and is an MPEG-4 in the first embodiment. Furthermore, (5) in the case where the compression/decompression unit 114 outputs the content received from the encoding/decoding processing unit 117 into the reproduction processing unit 116, the received content is outputted as non-compressed data into the reproduction processing unit 116 after being decompressed.

In the ROM area 118, the unique information of the recording/reproduction device 110 is recorded. The unique information is the information unique to the recording/reproduction device 110, and no other apparatuses have information identical to this unique information. The unique information is read-only, and cannot be rewritten.

The encoding/decoding processing unit 117 obtains the unique information of the external recording medium 160 located within the ROM area 164 of the external recording medium 160, and creates the reproduction disabled content compressed data B by encoding the content compressed data A received from the compression/decompression unit 114 with the use of its unique information. The encoding/decoding processing unit 117 transmits the created reproduction disabled content compressed data B to the external recording medium 160 via the data lines 143, 144, and 145. In the first embodiment, the content compressed data A is encoded to be disabled for reproduction by using the unique information of the external recording medium 160. The encoding/decoding processing unit 117 decodes the reproduction disabled content compressed data B so that the reproduction disabled content compressed data B is reactivated. The encoding and decoding process described above is not particularly specified herein. If the content becomes totally unusable due to the reproduction disabled processing but can be ensured to be reactivated through a reactivation process, another method, which uses no coding, may be used as a reproduction disabled method. The reproduction disabled content compressed data B is an example of the related content.

The encoding/decoding processing unit 117 creates a key KA and a key KB specifying a recording/reproduction device 110, which has issued an instruction for recording the reproduction disabled content compressed data B into the external recording medium 160 based on the unique information of the recording/reproduction device 110 stored in the ROM area 118 and the content compressed data A received from the compression/decompression unit 114. The key KA and key KB are identical. The encoding/decoding processing unit 117 allows the communication control unit 119 to store the key KB into the recording area 163 in the external recording medium 160, the key KA into the recording area 115 in the recording/reproduction device 110.

The encoding/decoding processing unit 117 receives the content compressed data A stored in the recording area 115 without being compressed or decompressed by the compression/decompression unit 114, and obtains a unique information of the external recording medium 160 in the ROM area 164 of the external recording medium 160. Using its unique information, the encoding/decoding processing unit 117 creates reproduction disabled content compressed data AN by disabling the content compressed data A for reproduction, and stores the created data AN into the recording area 115.

The encoding/decoding processing unit 117 obtains unique information of the external recording medium 160 in the ROM AREA 164 of the external recording medium 160, reactivates the reproduction disabled content compressed data B received from the external recording medium 160 via the communication processing unit 119 using the unique information, and transmits the reproduction disabled content compressed data B to the compression/decompression unit 114.

Next, the operation of the recording/reproduction device 110 and external recording medium 160 in the first embodiment are explained using from FIG. 3 to FIG. 7.

Figure 3:
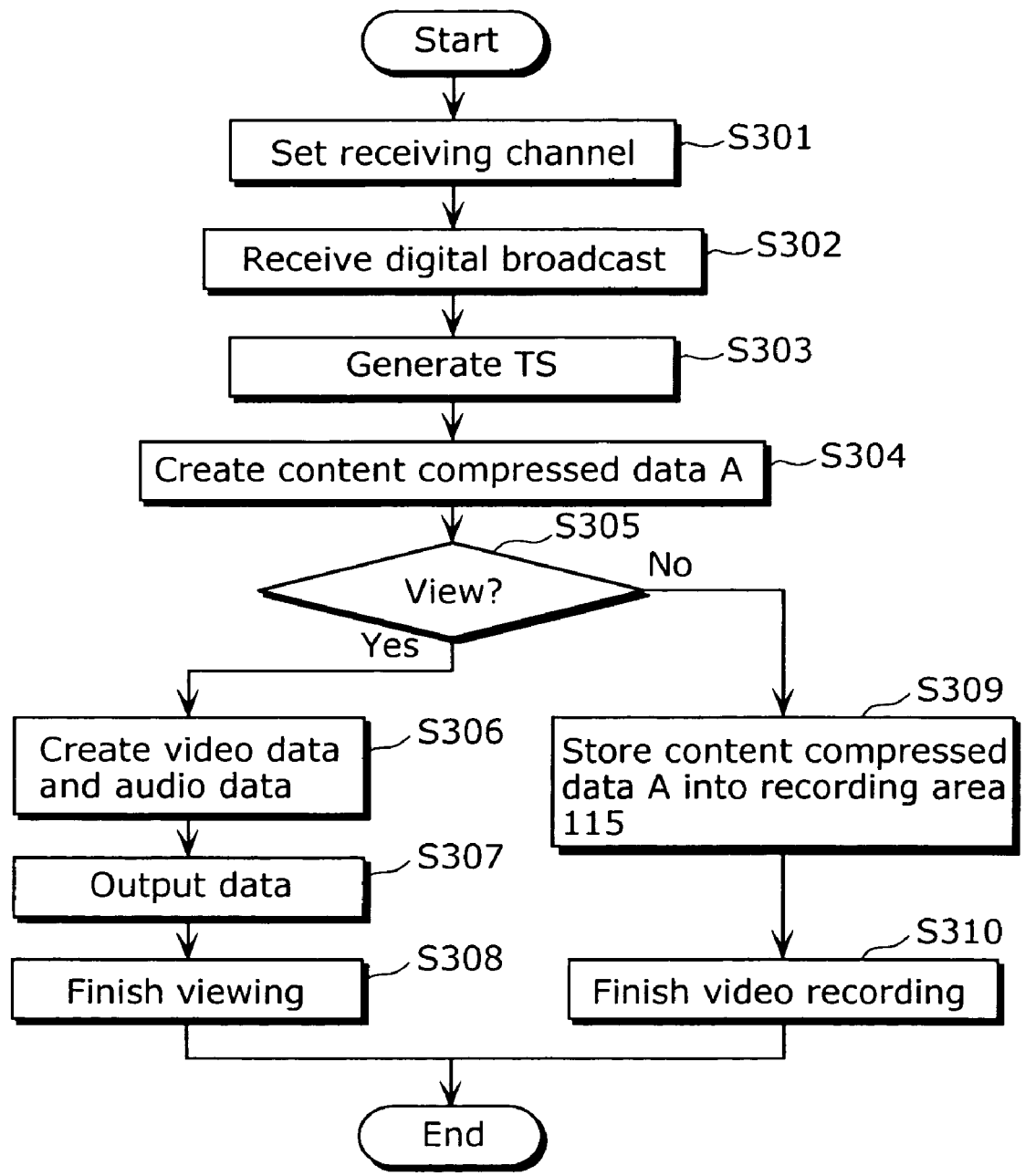
FIG. 3 is a flowchart showing a process of recording and a process of reproducing the digital broadcast signal received by the recording/reproduction device 110 according to the embodiment.

FIG. 3 is a flowchart indicating a procedure for reproducing a digital broadcast signal received by the recording/reproduction device 110 and a procedure for recording the received signal into the recording area 115.

First, a user sets a broadcast channel that he/she wishes to view to the tuner 111 (Step 301). The antenna 150 receives a digital broadcast signal (Step 302), and the demodulator 112 generates the TS of the receiving channel desired by the user from the broadcast signal (Step 303). The TS decoder 113 creates the content compressed data A by decoding the generated TS (Step 304). The compression/decompression unit 114 determines whether the user wishes to view the content in real time or to record the content into the recording area 115 (Step 305).

When the user wishes to view the content (Yes in Step 305), the compression/decompression unit 114 decompress the content compressed data A, and creates video data and audio data (Step 306). Subsequently, the reproduction processing unit 116 reproduces images based on the video data and outputs the reproduced images into the display device 130 (Step 307), and sounds based on the audio data and outputs the reproduced sounds into the speaker 131 (Step 307). When the user finishes viewing, the compression/decompression unit 114 ends the processing for viewing (Step 308).

On the other hand, when the user wishes for video recording (No in Step 305), the compression/decompression unit 114 accumulates the content compressed data A into the recording area 115 (Step 309). When the video recording is completed, the compression/decompression unit 114 ends the video recording (Step 310).

The operational procedure described in FIG. 3 is not different from that of a digital broadcast recording and reproduction device commonly available on the market. The present invention is an invention regarding a method of using the accumulated content, and the accumulation method is not limited. In the first embodiment, the terrestrial digital broadcast is received by the antenna 150, and is accumulated in the recording area 115. However, content distributed via the Internet may be accumulated in the recording area 115, or content recorded on a recording media including a DVD may be accumulated in the recording area 115. In other words, the content compressed data A is only required to comply with the rule of copy-once when being accumulated into the recording area 115.

Figure 4:
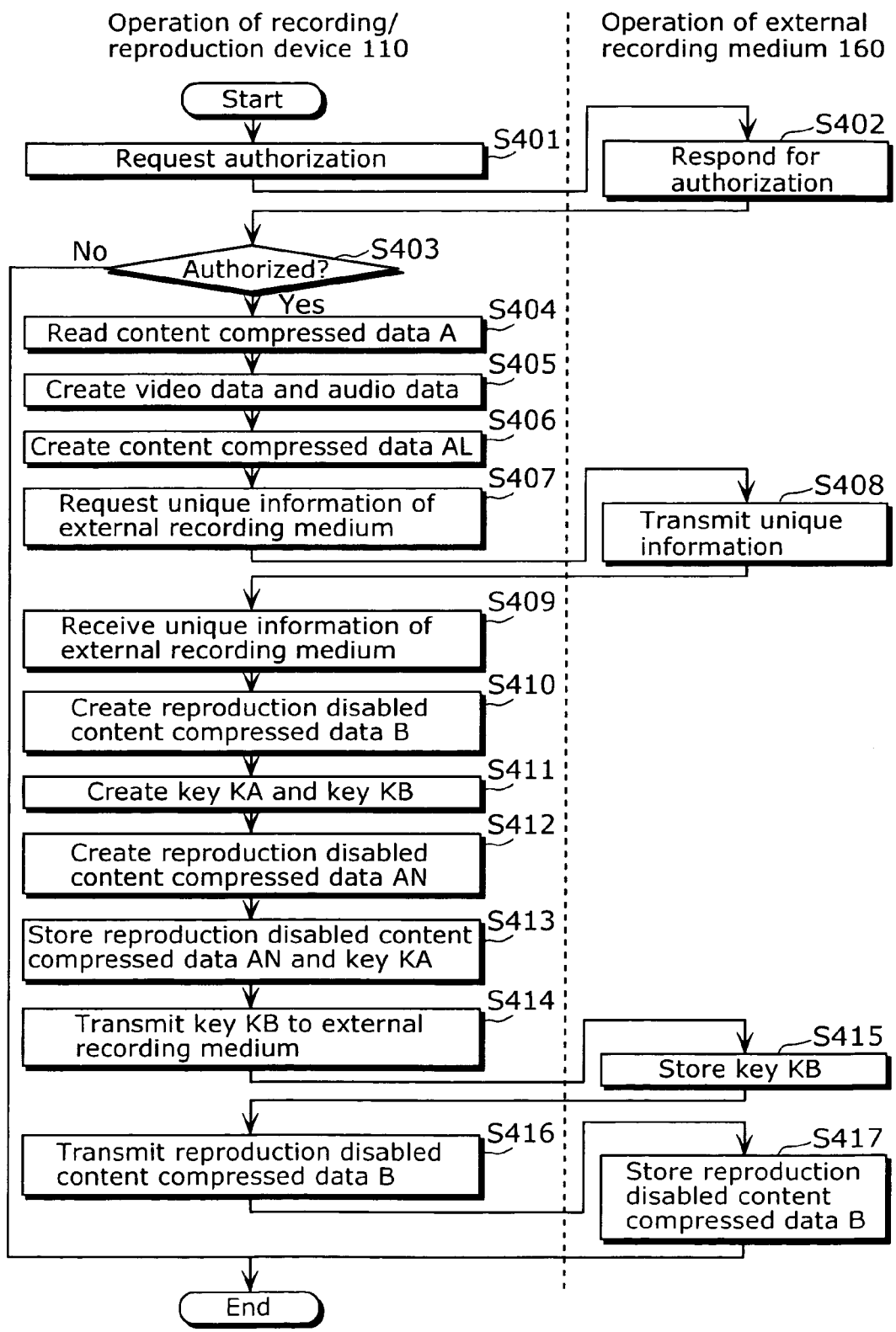
FIG. 4 is a flowchart showing a process of recording the data stored in a recording/reproduction device 110 according to the first embodiment into the external recording medium 160.

FIG. 4 is a flowchart indicating a procedure for recording the content compressed data A, which has been completed with the recording in Step 310 in FIG. 3 and stored in the recording/reproduction device 110, onto the external recording medium 160. Note that the data actually recorded on the external recording medium 160 is not the real content compressed data A, but is the reproduction disabled content compressed data B based on the content compressed data A, which is described below.

When a user wants to record the content compressed data A onto the external recording medium 160, the external recording medium 160 is inserted into the slot 200 of the recording/reproduction device 110. The recording/reproduction device 110 authorizes the external recording medium 160 following the predetermined procedure after confirming that the external recording medium 160 has been inserted into the slot 200 (Steps 401 and 402). The predetermined procedure is set to connect the connector placed in the slot 200 of the recording/reproduction device 110 to the external recording medium 160, and is determined for each standard of the external recording medium 160. The method for authorization is not limited as long as the method is performed following the procedure. However, based on this authorization method, a secured communication path, which prevents data stealing (data lines 143, 144 and 145) must be established between the recording/reproduction device 110 and external recording medium 160. Only in the case where the authorization is completed following the predetermined procedure, the external recording medium 160 is confirmed as an authorized external recording medium, and the secured communication path is ensured, the process of recording the content compressed data A (actually the reproduction disabled content compressed data B) onto the external recording medium 160 is continued. In the case where the authorization is failed (No in Step 403), a process of recording the content compressed data A (actually the reproduction disabled content compressed data B) onto the external recording medium 160 is stopped.

When the authorization is successful (Yes in Step 403), the compression/decompression unit 114 of the recording/reproduction device 110 reads out the content compressed data A stored in the recording area 115 (Step 404), decompresses the content compressed data A, and creates both video data and audio data (Step 405). The compression/decompression unit 114 compresses the created video data and audio data using a different format for recording the data onto the external recording medium 160, and creates a content compressed data AL (Step 406). The different format means, for example, a format with a low bit rate such as MPEG-4. In other words, a different format is a format for creating data with a quality lower than that of the source data. Note that the different format may be a format identical to that of the source data. In this case, however, a format to alter the source data into data with lower bit rate (data with a quality lower than that of the source data) is adopted.

The encoding/decoding processing unit 117 reads out the unique information of the connected external recording medium 160 (Step 407, 408, and 409). The unique information is stored in the ROM area 164 of the external recording medium 160. If each external recording medium has an ID and the like, the ID may be regarded as the unique information of the external recording medium 160. Furthermore, if a copyright protection technology such as CPRM is introduced, the introduced technology may be used. Specifically, the encoding/decoding processing unit 117 requests the external recording medium 160 for transmitting the unique information (Step 407). The external recording medium 160 transmits the unique information to the recording/reproduction device 110 in accordance with the request (Step 408), and the encoding/decoding processing unit 117 obtains the unique information (Step 409).

The encoding/decoding processing unit 117 encodes the content compressed data AL using the obtained unique information of the external recording medium 160, and disables the content compressed data AL for reproduction by encoding the content compressed data AL, creates the reproduction disabled content compressed data B (Step 410), and stores the created data into the recording area 115. In the case where a copyright protection technology such as CPRM is introduced, the encoding/decoding processing unit 117 may disable the content compressed data AL for reproduction by using the system of the introduced technology, and create the reproduction disabled content compressed data B.

Next, the encoding/decoding processing unit 117 creates a key KA and a key KB based on the content compressed data A and the unique information of the recording/reproduction device 110 (Step 411). The key KA and key KB are identical, and are used to confirm as described below that a recording/reproduction device for deleting the reproduction disabled content compressed data B to be recorded onto the external recording medium 160 is identical to the recording/reproduction device 110. The unique information of the recording/reproduction device 110 has been recorded on the ROM area 118. The encoding/decoding processing unit 117 is capable of creating a unique and inforgeable key KA and a key KB by using the unique information such as an ID, which is different according to an apparatus. Note that the key KB is an example of information regarding the unique information of the recording/reproduction device 110.

The encoding/decoding processing unit 117 encodes the content compressed data A by using the obtained unique information of the external recording medium 160, disables the content compressed data A for reproduction by encoding the content compressed data A, and creates the reproduction disabled content compressed data AN (Step 412). In the case where a copyright protection technology such as the CPRM or the like is introduced, the encoding/decoding processing unit 117 may create the reproduction disabled content compressed data AN based on the system of the introduced technology. Moreover, after encoding the content compressed data A, the encoding/decoding processing unit 117 deletes the pre-encoding content compressed data A and the unique information of the external recording medium 160. This allows the reproduction disabled content compressed data AN to be decoded only when the unique information of the external recording medium 160 is obtained. In other words, since no unique information of the external recording medium 160 for decoding the reproduction disabled content compressed data AN exists in the recording/reproduction device 110, the reproduction disabled content compressed data AN within the recording/reproduction device 110 cannot be reproduced.

The recording area 115 stores the created reproduction disabled content compressed data AN and the key KA (Step 413).

Next, the encoding/decoding processing unit 117 transfers the key KB from the recording/reproduction device 110 to the external recording medium 160 (Step 414), and records the key KB onto the recording area 163 of the external recording medium 160 (Step 415).

The encoding/decoding processing unit 117 then transfers the reproduction disabled content compressed data B via the communication processing unit 119 from the recording/reproduction device 110 to the external recording medium 160 (Step 416), and records the transferred data onto the recording area 163 of the external recording medium 160 (Step 417).

Figure 5:
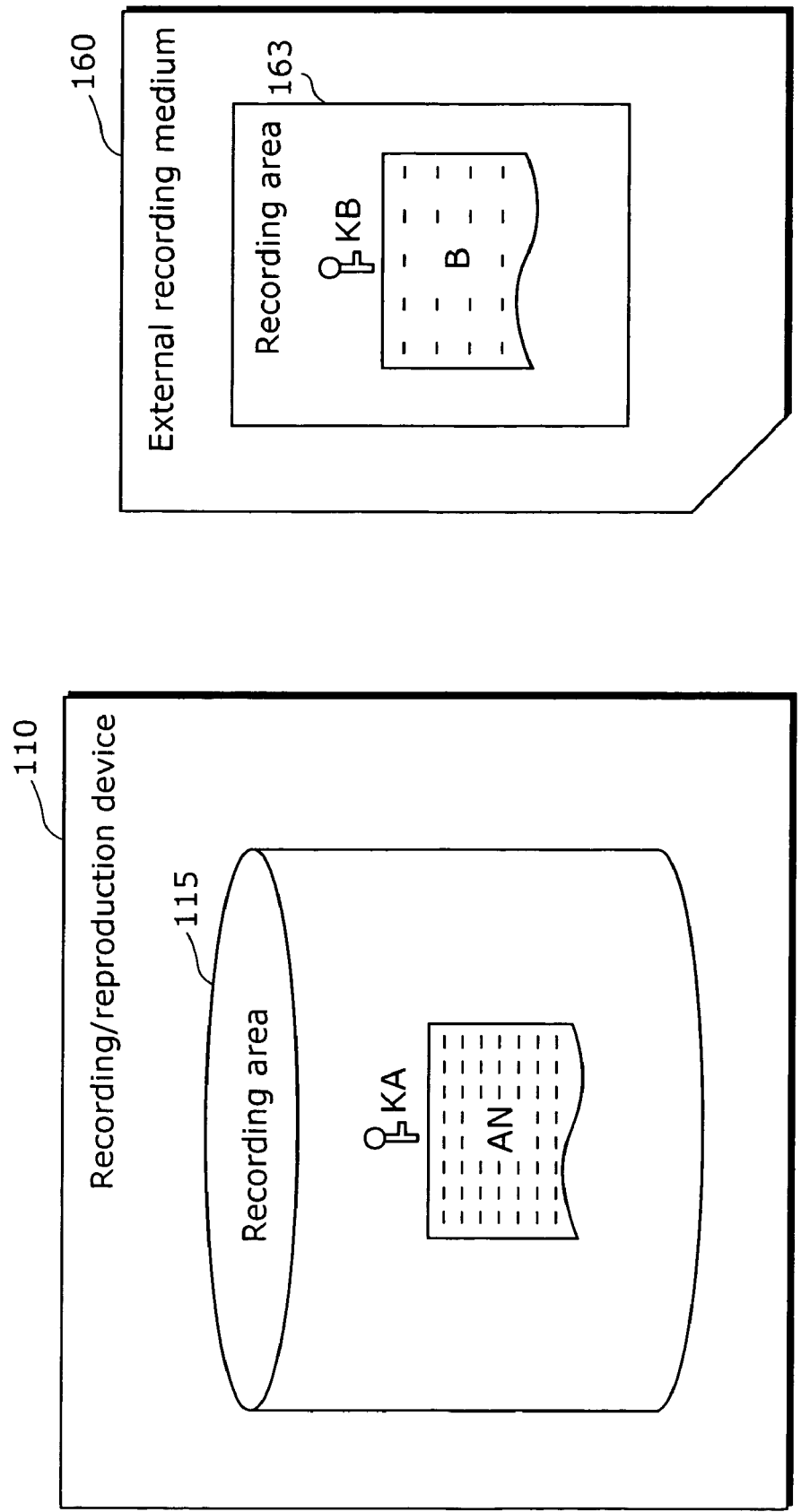
FIG. 5 is a diagram showing a state, in which reproduction disabled content compressed data AN and a key KA are stored into the recording/reproduction device 110 and reproduction disabled content compressed data B and a key KB are stored into the external recording medium 160, according to the first embodiment.

This operation allows the reproduction disabled content compressed data AN and the key KA to be stored into the recording area 115 of the recording/reproduction device 110, and the reproduction disabled content compressed data B and the key KB to be stored into the recording area 163 of the external recording medium 160, as described in FIG. 5. The reproduction disabled content compressed data AN and the reproduction disabled content compressed data B have details that are identical to each other. However, while the reproduction disabled content compressed data AN is data with a bit rate as high as that of the content compressed data A (high quality data), the reproduction disabled content compressed data B is data with a bit rate as low as that of the content compressed data A (low quality data).

Both the reproduction disabled content compressed data AN and the reproduction disabled content compressed data B are disabled for reproduction by the unique information of the external recording medium 160. Thus, the reproduction disabled content compressed data AN can be demodulated only when the external recording medium 160 is connected to the recording/reproduction device 110, and the reproduction disabled content compressed data B can be demodulated only when being used in conjunction with the unique information of the external recording medium 160. Since both the recording/reproduction device 110 and the external recording medium 160 include contents having identical details, the process described above technically indicates that copying operation has been executed. However, only one of these contents can be activated to be reproducible at a time, and rendering the other content irreproducible. For that reason, it is possible for a user and a copyright holder to consider that a process equivalent to move has been performed.

This means the completion of the process of recording the content compressed data A (actually the reproduction disabled content compressed data B), which is recorded on the recording/reproduction device 110, onto the external recording medium 160.

Figure 6:
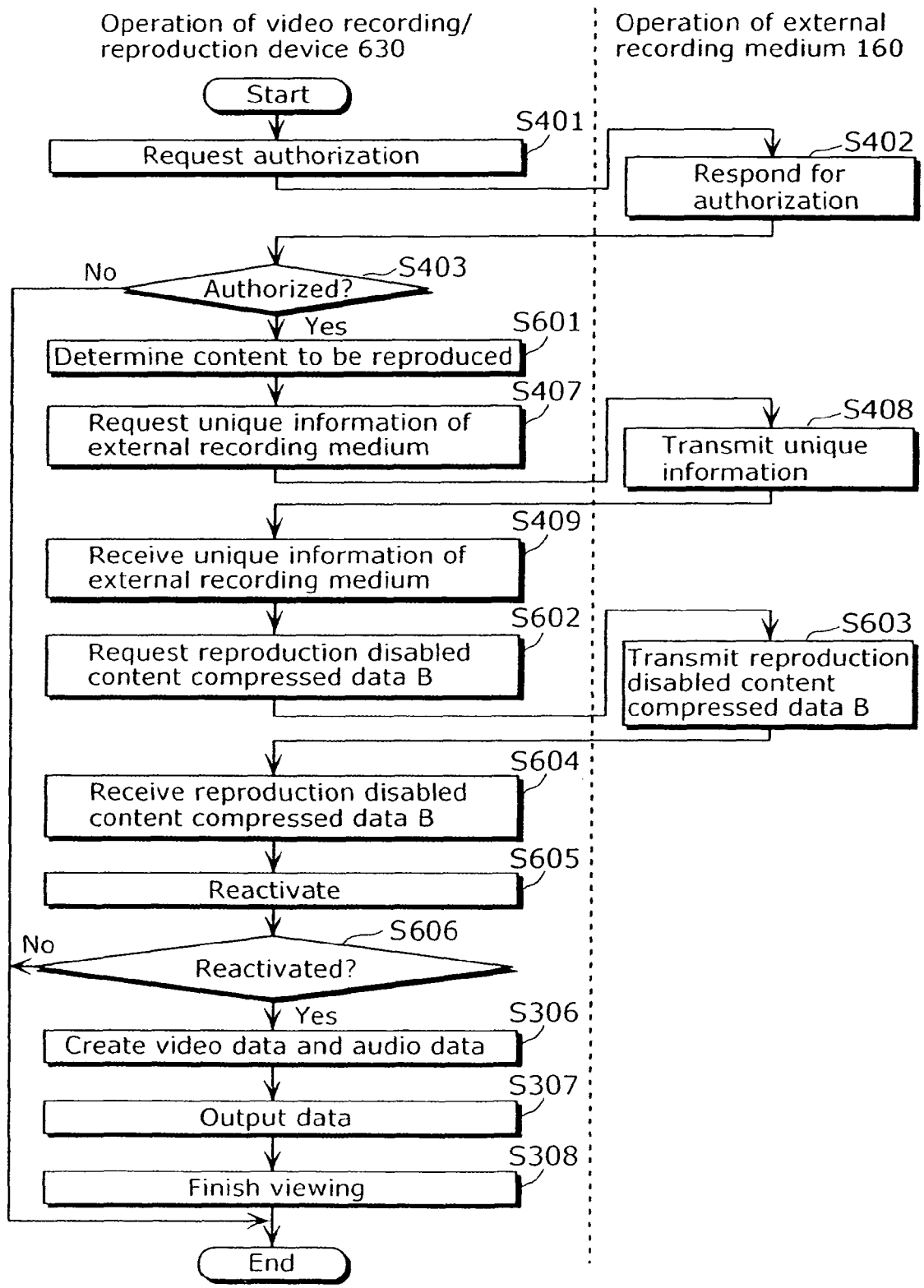
FIG. 6 is flowchart showing a process of reproducing data recorded on the external recording medium 160 according to the first embodiment.

FIG. 6 is a flowchart showing a procedure for reproducing the content recorded on the external recording medium 160 following the procedure described in FIG. 4, using the video recording/reproduction device 630.

The object of recording content onto the external recording medium 160 is to allow a user to view the content using an apparatus with a function for reproduction other than the recording/reproduction device 110. Thus, in the explanation using FIG. 6, it is assumed that the video recording reproduction device 630 and the recording/reproduction device 110 are different devices. However, the video recording/reproduction device 630 may be identical to the recording/reproduction device 110.

As the first procedure for reproduction, the video recording/reproduction device 630 and the external recording medium 160 perform authorization (Steps 401, 402, and 403). This procedure is identical to Steps 401, 402, and 403 explained in FIG. 4. In the case where the external recording medium 160 is not an authorized external recording medium (No in Step 403), the reproduction process is ended.

In the case where the external recording medium 160 is an authorized external recording medium 160 (Yes in Step 403), the content to be viewed is determined by a user selecting the content to be viewed and inputting an instruction for specifying the content by using a user interface in the video recording/reproduction device 630 (Step 601). To simplify the explanation, it is assumed that the content determined by the user is the content recorded on the external recording medium 160.

Next, the video recording/reproduction device 630 obtains the unique information of the external recording medium 160 (Steps 407, 408, and 409). This procedure is identical to the Steps 407, 408, and 409 in FIG. 4.

Next, the video recording/reproduction device 630 requests the external recording medium 160 to transmit the reproduction disabled content compressed data B, which is the content determined in Step 601 (Step 602). The external recording medium 160 transmits the reproduction disabled content compressed data B to the video recording/reproduction device 630 in accordance with the request (Step 603), and the video recording/reproduction device 630 receives the reproduction disabled content compressed data B (Step 604).

The video recording reproduction device 630 activates the obtained reproduction disabled content compressed data B by an internally-placed encoding/decoding processing unit 117, using the unique information of the external recording medium 160, which has been obtained in advance (Step 605). When it is impossible to activate the obtained reproduction disabled content compressed data B (No in Step 606), reproduction process is ended. In that case, the unique information of the external recording medium 160 used to create the reproduction disabled content compressed data B can be different from the unique information of the external recording medium used to activate the reproduction disabled content compressed data B. The unique information of the external recording medium is recorded in the ROM area 164 and is rewritable. Thus, it is highly possible that the external recording medium used for the explanation in FIG. 6 is different from the external recording medium used for the explanation in FIG. 4. This is a problem arising in the case where the content of the external recording medium 160 is copied into the external recording medium, and contradicts the copyright protection. Since the unique information of the external recording medium 160 is used when the content is disabled for reproduction, the unique information is necessary when the content is activated. Thus, since the content cannot be reproduced even when being copied, this serves as protection for copying.

The case of which the reproduction disabled content compressed data B is activated in Step 605 (Yes in Step 606) indicates that the reproduction disabled content compressed data B is confirmed as the data recorded on the external recording medium 160, which is used in the explanation of FIG. 4, and the reproduction process continues. The video recording/reproduction device 630 decompresses the reproduction disabled content compressed data B by the compression/decompression unit 114, and creates and reproduces the video data and audio data (Steps 306, 307, and 308). The procedure for reproduction is identical to that of Steps 306, 307, and 308 in FIG. 3.

Figure 7:
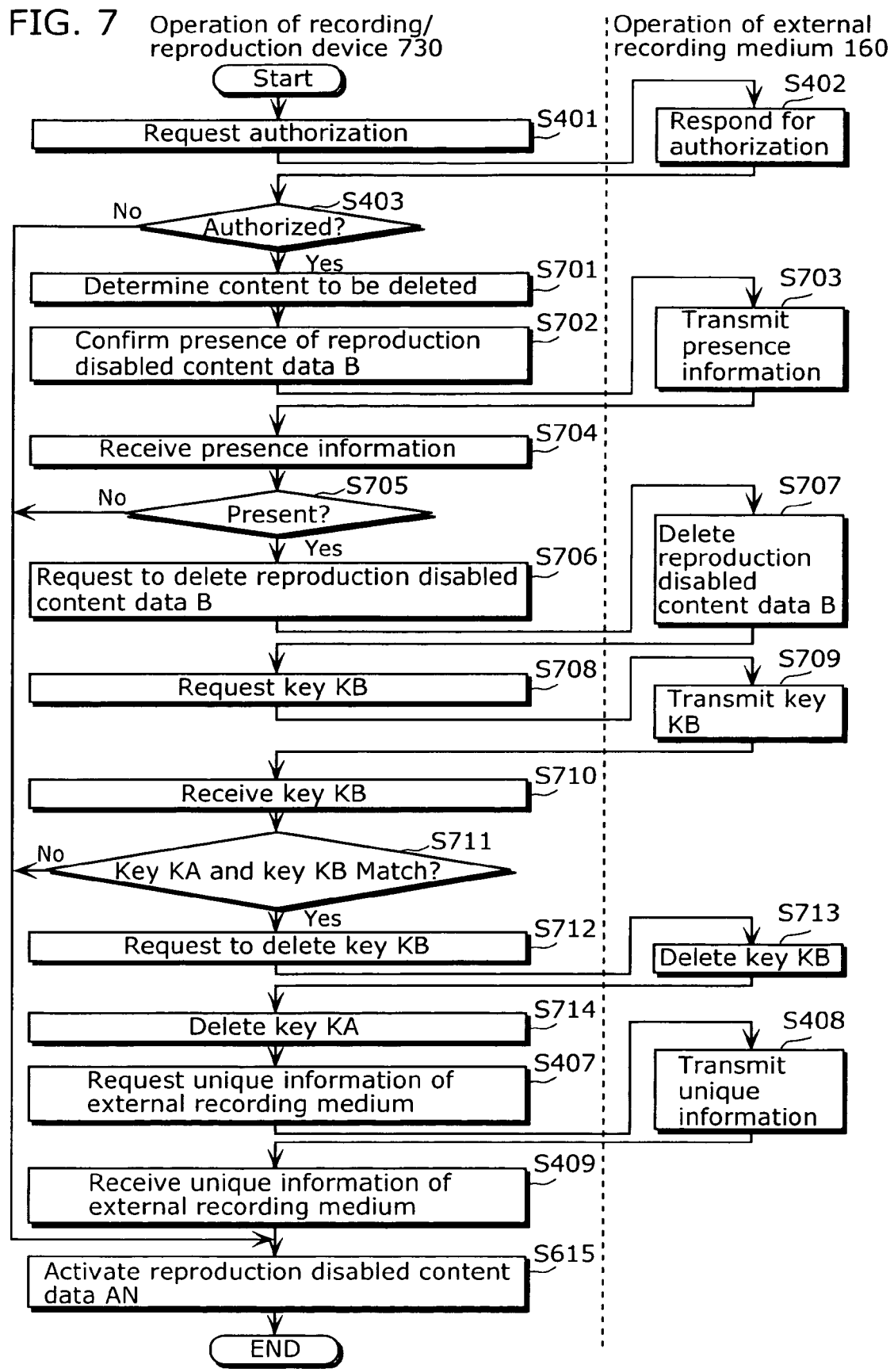
FIG. 7 is a flowchart showing a process of deleting content recorded on the external recording medium 160 and a process of virtually moving the content back to the recording/reproduction device 110, according to the first embodiment.

FIG. 7 is a flowchart showing a procedure for virtually moving the content recorded on the external recording medium 160 back to the recording/reproduction device 110 and a procedure for deleting the content recorded on the external recording medium 160.

The recording/reproduction device 730 indicates both the recording/reproduction device 110 and other recording/reproduction devices. The recording/reproduction device 110 and other recording/reproduction devices proceed to different procedure at Step 711 but until then they follow identical steps. Moreover, the recording/reproduction devices other than the recording/reproduction device 110 include a reproduction device. However, the reproduction device has a function for deleting the content recorded on the external recording medium 160.

As the beginning of the procedure for reproducing content, the recording/reproduction device 730 and the external recording medium 160 perform authorization (Step 401, 402, and 403). These procedures are identical to the Steps 401, 402, and 403 explained in FIG. 4. In the case where the external recording medium 160 is not an authorized external recording medium (No in Step 403), the reproduction process is ended.

In the case where the external recording medium 160 is an authorized external recording medium (Yes in Step 403), the user selects the content to be deleted, and determines the content to be deleted by inputting an instruction to specify the content using a user interface in the recording/reproduction device 730 (Step 701). To simplify the explanation, the content determined by the user is assumed to be the content recorded onto the external recording medium 160 in FIG. 4.

Next, the recording/reproduction device 730 confirms whether or not the reproduction disabled content compressed data B, which is the selected content, is stored in the external recording medium 160 (Step 702). Specifically, the encoding/decoding processing unit 117 of the recording/reproduction device 730 requests the external recording medium 160 to transmit the information that shows whether the reproduction disabled content compressed data B is stored in the external recording medium 160 (Step 702). The external recording medium 160 transmits the information regarding the presence of the reproduction disabled content compressed data B, according to the request, to the recording/reproduction device 730 (Step 703), and the encoding/decoding processing unit 117 receives the information from the external recording medium 160 via the communication processing unit 119 (Step 704).

In the case where the reproduction disabled content compressed data B is stored in the external recording medium 160 (Yes in Step 705), the process proceeds to Step 706. On the other hand, in the case where the reproduction disabled content compressed data B is not stored in the external recording medium 160 (No in Step 705), the operation of the recording/reproduction device 730 is ended In the case where the reproduction disabled content compressed data B is stored in the external recording medium 160 (Yes in Step 705), the recording/reproduction device 730 requests for deleting the reproduction disabled content compressed data B (Step 706). Specifically, the encoding/decoding processing unit 117 of the recording/reproduction device 730 transmits the request for deleting the reproduction disabled content compressed data B to the external recording medium 160 (Step 706). The external recording medium 160 deletes the reproduction disabled content compressed data B, according to the request (Step 707). This allows the storage capacity of the external recording medium 160 to be effectively utilized. When the reproduction disabled content compressed data B is deleted from the external recording medium 160 (Step 707), the process proceeds to Step 708.

The recording/reproduction device 730 requests for obtaining the key KB, which is a counterpart to the deleted reproduction disabled content compressed data B (Step 708). Specifically, the encoding/decoding processing unit 117 of the recording/reproduction device 730 transmits the request for transmitting the key KB to the external recording medium 160 (Step 708). The external recording medium 160 transmits the key KB to the recording/reproduction device 730 according to the request (Step 709). The encoding/decoding processing unit 117 receives the key KB from the external recording medium 160 (Step 710).

The encoding/decoding processing unit 117 determines whether or not the obtained key KB matches the key KA stored in the recording/reproduction device 730 (Step 711). In the case where the key KA does not match the key KB (No in Step 711), the recording/reproduction device 730 and the external recording medium 160 end the operation. In the cases where the recording/reproduction device 730 does not obtain the key KB in Step 710 and where the key KA is not stored in the recording/reproduction device 730, the encoding/decoding processing unit 117 determines that the key KA does not match the key KB.

On the other hand, in the case where the key KA matches the key KB (Yes in Step 711), it is possible to move the content in the external recording medium 160 back to the recording/reproduction device 730 (110), and the process proceeds to the Step 712, because the recording/reproduction device 730 is identical to the recording/reproduction device 110.

The encoding/decoding processing unit 117 of the recording/reproduction device 730 (110) instructs to delete the key KB in the external recording medium 160 (Step 712). The external recording medium 160, which received the instruction, deletes the key KB (Step 713). With this step, all information in the external recording medium 160 is deleted. Moreover, the recording/reproduction device 730 (110) also deletes the key KA, which is retained by the recording/reproduction device 730 (110) (Step 714).

Next, the encoding/decoding processing unit 117 of the recording/reproduction device 730 (110) obtains the unique information of the external recording medium 160 (Steps 407, 408, and 409). The method to obtain the unique information is identical to Steps 407, 408, and 409 explained in FIG. 4. The recording/reproduction device 730 (110) activates the reproduction disabled content compressed data AN in the recording area 115 by using the unique information of the external recording medium 160 obtained by the encoding/decoding processing unit 117 (Step 715).

This allows the content compressed data A to be recorded into the recording area 115 of the recording/reproduction device 730 (110), and completes a virtual process of returning the content from the external recording medium 160 to the recording/reproduction device 730 (110).

As described above, in the case of reactivating the content compressed data A, the recording/reproduction device 110 of the first embodiment activates the reproduction disabled content compressed data AN stored in the recording area 115 (see FIG. 5), without using the reproduction disabled content compressed data B. The reproduction disabled content compressed data AN data has details which are identical to the details of the reproduction disabled content compressed data B, and has the high bit rate as the content compressed data A. This realizes a virtual returning process, which has no adverse impact from the degradation of image quality and sound quality caused by the creation of the reproduction disabled content compressed data B from the content compressed data A explained in FIG. 4.

In other words, in the case of recording the reproduction disabled content compressed data B onto the external recording medium 160, the recording/reproduction device 110 of the first embodiment deletes the content compressed data A, while keeping the reproduction disabled content compressed data AN, which is created by disabling the content compressed data A for reproduction and has a high bit rate as the content compressed data A. In addition in the case where the external recording medium 160 is inserted into the slot 200 in the recording/reproduction device 110, the recording/reproduction device 110 activates the reproduction disabled content compressed data AN by using the unique information of the external recording medium 160. This allows the content compressed data A to be restored to have a high image quality and sound quality.

Moreover, in Step 711, since the recording/reproduction device 730 is different from the recording/reproduction device 110, in the case that the key KA does not match the key KB (No in Step 711), the key KB remains in the external recording medium 160 even after deleting the reproduction disabled content compressed data B recorded on the external recording medium 160 (Step 707). Subsequently, since the external recording medium 160 can transmit the key KB to the recording/reproduction device 110 when inserting the external recording medium 160 into the slot 200 of the recording/reproduction device 110, the content compressed data A can be obtained by activating the reproduction disabled content compressed data AN recorded in the recording area 115 of the recording/reproduction device 110. In the case where the reproduction disabled content compressed data B is unnecessary, a user can delete the reproduction disabled content compressed data B, and use the recording area 163 of the external recording medium 160 for storing other data. Since the size of the information of the key KB is much smaller than the reproduction disabled content compressed data B, it is possible to effectively use the recording area 163 of the external recording medium 160 by deleting the reproduction disabled content compressed data B.

Note that, in the aforementioned first embodiment, in the case where the content compressed data A recorded on the recording/reproduction device 110 is recorded onto the external recording medium 160, the recording/reproduction device 110 records the content compressed data A onto the external recording medium 160 lowering its bit rate. However, the recording/reproduction device 110 may transmit the content compressed data A to the external recording medium 160 without lowering the bit rate, and the external recording medium 160 may record the content compressed data A lowering its bit rate. Furthermore the recording/reproduction device 110 may transmit the content compressed data A to the external recording medium 160 without lowering the bit rate, and the external recording medium 160 may record the content compressed data A without lowering the bit rate.

Moreover, in Steps 706 and 707 in FIG. 7, the encoding/decoding processing unit 117 of the recording/reproduction device 730 transmits a request for deleting the reproduction disabled content compressed data B to the external recording medium 160 (Step 706), the external recording medium 160 deletes the reproduction disabled content compressed data B according to the request (Step 707). However, the reproduction disabled content compressed data B may be changed to be incapable of reproducing the content rather than being deleted. The encoding/decoding processing unit 117 may perform such change. In other words, in the case where the reproduction disabled content compressed data AN is reproduced and the reproduction disabled content compressed data B is recorded on the external recording medium 160, the state of the reproduction disabled content without lowering the bit rate compressed data B recorded on the external recording medium 160 is required only to be changed into a state, in which the content is irreproducible.

Figure 8:
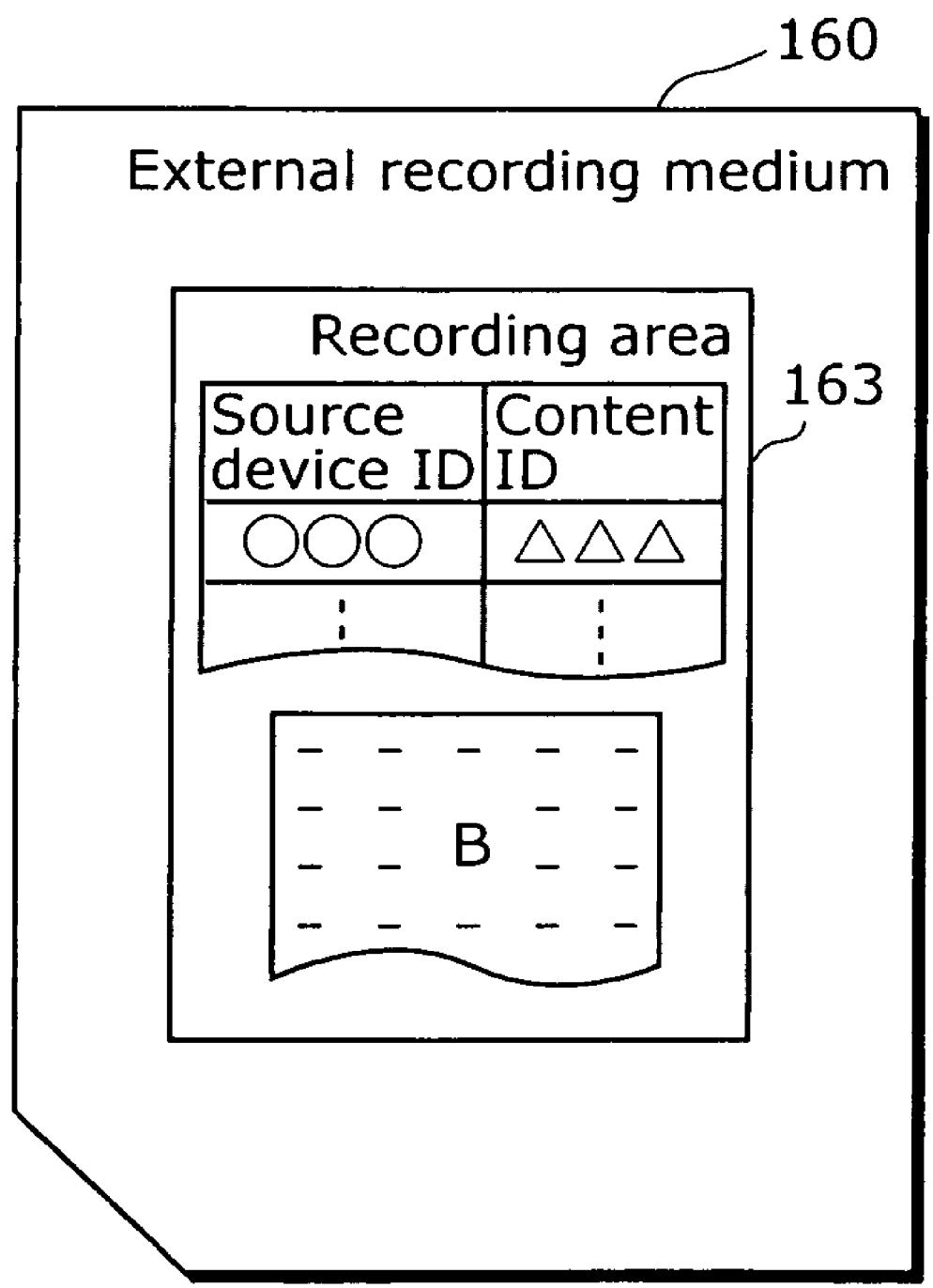
FIG. 8 is a diagram showing a state, in which a set of a reproduction disabled content compressed data B and two identifiers, which are an identifier (a source device ID) for identifying the transmission source of the reproduction disabled content compressed data B and an identifier (a content ID) for identifying reproduction disabled content compressed data B, is stored into the external recording medium 160 according to the first embodiment.

In addition, when recording the reproduction disabled content compressed data B, the external recording medium 160 may record a set of an identifier (the original device ID) for identifying the transmission source of the reproduction disabled content compressed data B and an identifier (the content ID) for identifying the reproduction disabled content compressed data B as described in FIG. 8, rather than recording the key KB as described in FIG. 5. In this case, the source device ID is an identifier for identifying the recording/reproduction device 110. The set is a history showing that the external recording medium 160 has recorded the reproduction disabled content compressed data B. Moreover, in the case where the encoding/decoding processing unit 117 has a history showing that the external recording medium 160 has recorded the reproduction disabled content compressed data B, the recording/reproduction device 730 is judged to be an apparatus identical to the recording/reproduction device 110. In other words, the reproduction disabled content compressed data B is judged to have been recorded on the external recording medium 160, and the encoding/decoding processing unit 117 may reproduce the reproduction disabled content compressed data AN by obtaining the unique information of the external recording medium 160.

Furthermore, although the encoding/decoding processing unit 117 is used as a judging method for the recording/reproduction device of the present invention in the first embodiment stated above, the judging method may not be the encoding/decoding processing unit 117.

Second Embodiment

Next, the recording/reproduction device 110 and the external recording medium 160 of the second embodiment shall be explained below.

The configuration of the recording/reproduction device 110 in the second embodiment is the same as the configuration of the recording/reproduction device 110 in the first embodiment. The configuration of the external recording medium 160 in the second embodiment is the same as the configuration of the external recording medium 160 in the first embodiment. The operations of the recording/reproduction device 110 and external recording medium 160 in the second embodiment are explained below using FIG. 9 to FIG. 11.

The operation for reproducing the content compressed data A accumulated in the recording/reproduction device 110 after recording it onto the external recording medium 160 is explained in the second embodiment. The operation for accumulating the content compressed data A into the recording/reproduction device 110 is omitted, as being explained in the first embodiment.

Figure 9:
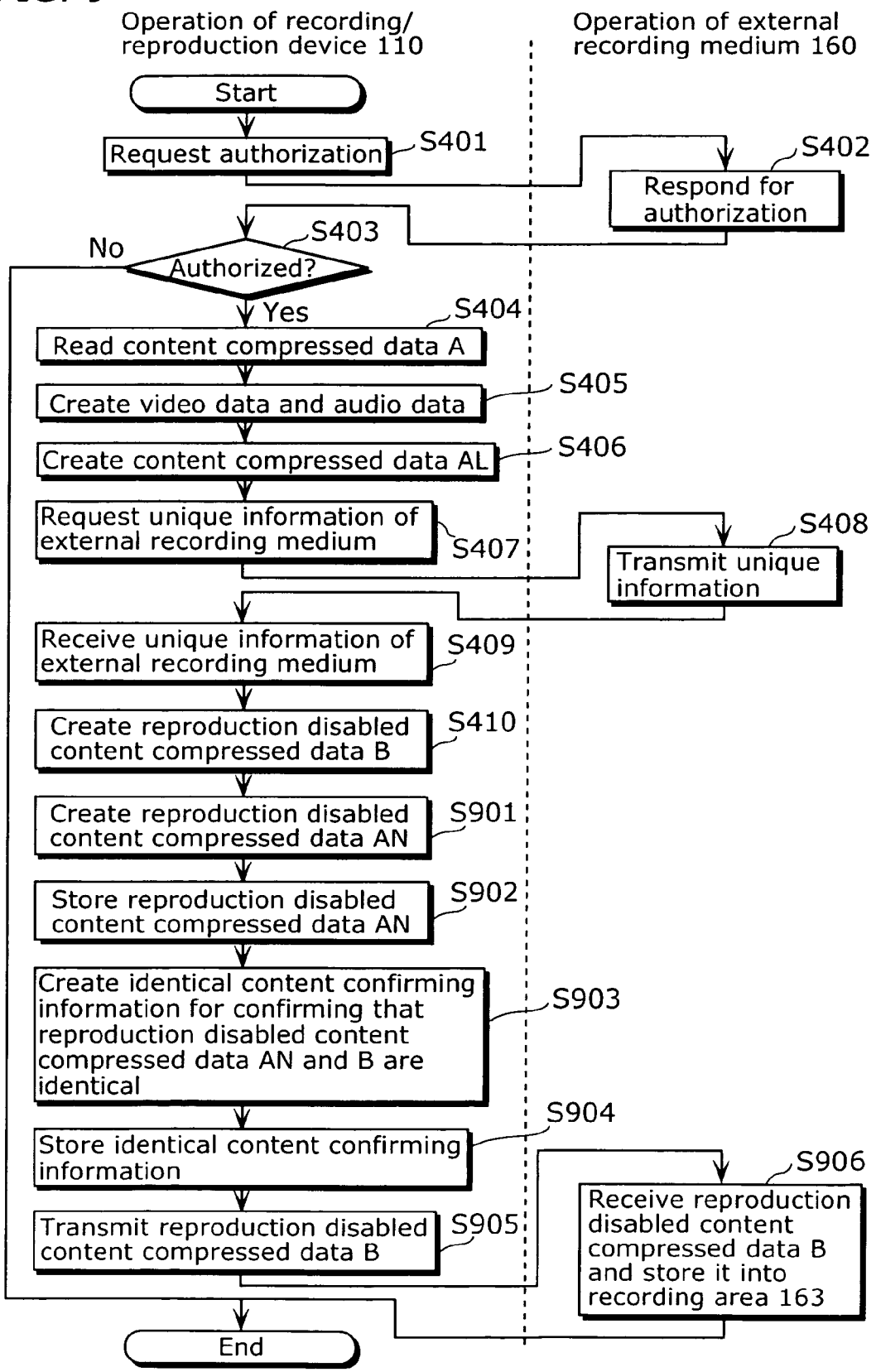
FIG. 9 is a flowchart showing steps for recording the data stored into a recording/reproduction device 110 into an external recording medium 160 according to the second embodiment.

FIG. 9 is a flowchart showing a procedure for recording the content compressed data A stored in the recording/reproduction device 110 onto the external recording medium 160. Note that the data to be actually recorded on the external recording medium 160 is the reproduction disabled content compressed data B based on the content compressed data A rather than the content compressed data A itself.

When recording the content compressed data A onto the external recording medium 160, a user inserts the external recording medium 160 into the slot 200 of the recording/reproduction device 110. After confirming that the external recording medium 160 was inserted, the recording/reproduction device 110 authorizes the external recording medium 160 through the predetermined procedure (Steps 401, 402, and 403). This procedure is identical to the Steps 401, 402, and 403 explained in FIG. 4. The process of recording the content compressed data A (actually the reproduction disabled content compressed data B) onto the external recording medium 160 is continued only when the external recording medium 160 is confirmed as an authorized external recording medium and a secure communication path is ensured, after the authorization is completed in accordance with the predetermined procedure. When the external recording medium is not authorized (No in Step 403), the recording of the content compressed data A (actually the reproduction disabled content compressed data B) onto the external recording medium is stopped.

When the external recording medium is authorized (Yes in Step 403), the compression/decompression unit 114 of the recording/reproduction device 110 reads out the content compressed data A stored in the recording area 115 (Step 404), decomposes the content compressed data A, and creates video data and audio data (Step 405). The compression/decompression unit 114 compresses the video data and audio data using another format for recording them into the external recording medium 160, and creates content compressed data AL (Step 406). Another format indicates a format with low bit rate such as an MPEG-4 or the like. That is, another format is a format for creating the data with a quality lower than that of the source data. Note that the format may be the same format as that of the source data. In that case, however, a format for changing the source data into data with a bit rate lower than that of the source data (or data with a quality lower than that of the source data) is adopted.

The encoding/decoding processing unit 117 reads out the unique information of the external recording medium 160 connected to the encoding/decoding processing unit 117 (Steps 407, 408, and 409). The unique information is stored in the ROM area 164 in the external recording medium 160. If an ID or the like is allocated to each external recording medium, the ID may be regarded as the unique information of the external recording medium 160. Furthermore, when a copyright protection technology such as a CPRM or the like is introduced, the technology may be used. Specifically, the encoding/decoding processing unit 117 requests the external recording medium 160 to transmit the unique information (Step 407). The external recording medium 160 transmits the unique information to the recording/reproduction device 110 in response to the request (Step 408), and the encoding/decoding processing unit 117 obtains the unique information (Step 409).

The encoding/decoding processing unit 117 encodes the content compressed data AL using the obtained unique information of the external recording medium 160, disables the content compressed data AL for reproduction by encoding the content compressed data AL, creates the reproduction disabled content compressed data B (Step 410), and stores it into the recording area 115. In the case where copyright protection technologies such as a CPRM is introduced, the encoding/decoding processing unit 117 may create the reproduction disabled content compressed data B by disabling the content compressed data AL for reproduction using the technology.

The encoding/decoding processing unit 117 encodes the content compressed data A using the obtained unique information of the external recording medium 160, disables the content compressed data A for reproduction by encoding the content compressed data A, creates the reproduction disabled content compressed data AN (Step 901), and stores it into the recording area 115 (Step 902). In the case where the copyright protection technology such as a CPRM or the like, the encoding/decoding processing unit 117 may create the reproduction disabled content compressed data AN using the technology. Moreover, after encoding the content compressed data A, the encoding/decoding processing unit 117 deletes the non-encoded content compressed data A, and the unique information of the external recording medium 160. This allows the recording/reproduction device 110 to decode the reproduction disabled content compressed data AN only when obtaining the unique information of the external recording medium 160. In other words, since there is no unique information of the external recording medium 160 in the recording/reproduction device 110, the reproduction disabled content compressed data AN is cannot reproduce the reproduction disabled content compressed data AN in the recording/reproduction device 110.

Furthermore, the encoding/decoding processing unit 117 generates information (identical content confirming information) for confirming that the reproduction disabled content compressed data AN and the reproduction disabled content compressed data B are created based on the identical content (content compressed data A) (Step 903), and stores it into the recording/reproduction device 110 (Step 904). In other words, the identical content confirming information is the information indicating that the details of the reproduction disabled content compressed data AN are identical to the details of the reproduction disabled content compressed data B. The identical content confirming information is a table, for example, on which an identifier for the source data are associated with an identifier for the data recorded externally as described in FIG. 10. In FIG. 10, the reproduction disabled content compressed data AN and the reproduction disabled content compressed data B are associated with each other in the column (1).

Next, the encoding/decoding processing unit 117 transfers the reproduction disabled content compressed data B from the recording/reproduction device 110 to the external recording medium 160 via the communication processing unit 119 (Step 905), and records it into the recording area 163 in the external recording medium 160 (Step 905).

The reproduction disabled content compressed data AN and the reproduction disabled content compressed data B are identical data. However, while the reproduction disabled content compressed data AN is data with a high bit rate (high quality data) as the content compressed data A, the reproduction disabled content compressed data B is data with a bit rate lower than that of the content compressed data A (low quality data).

The reproduction disabled content compressed data AN and the reproduction disabled content compressed data B are both disabled for reproduction by using the unique information of the external recording medium 160. For that reason, the reproduction disabled content compressed data AN can be demodulated only when the external recording medium 160 is connected with the recording/reproduction device 110, and the reproduction disabled content compressed data B can be demodulated only when being used with the unique information of the external recording medium 160. Since the same details of data exist in both the recording/reproduction device 110 and the external recording medium 160, this is technically the same as copy execution. However, one of the contents alone can be activated to be reproducible, and the other content is irreproducible. For that reason, the user and copyright holder can regard that a process equivalent to move has been performed.

With the process described above, the process of recording the content compressed data A (actually the reproduction disabled content compressed data B), which was recorded on the recording/reproduction device 110, onto the external recording medium 160 is completed.

Figure 11:
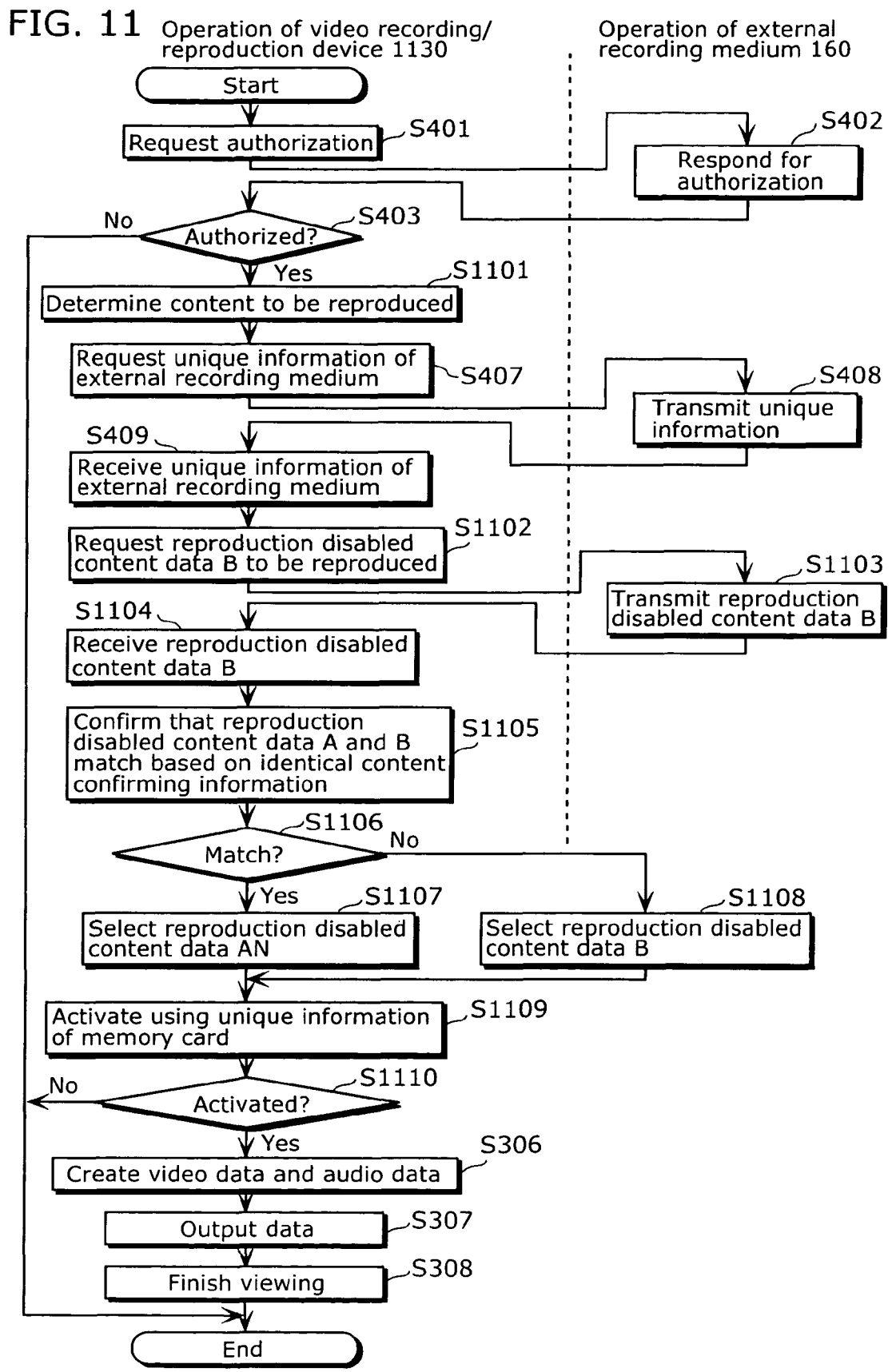
FIG. 11 is a flowchart showing steps for reproducing the content recorded on the external recording medium 160, into a video recording/reproduction device 1130 according to the second embodiment.

FIG. 11 is a flowchart showing a procedure for reproducing the content recorded on the external recording medium 160 by using a video recording reproduction device 1130 in accordance with the procedure described in FIG. 9.

As the first procedure for reproduction, the video recording reproduction device 1130 and the external recording medium 160 are authorized (Steps 401, 402, and 403). This procedure is identical to Steps 401, 402, and 403 explained in FIG. 4. In the case where the external recording medium 160 is not an authorized external recording medium (No in Step 403), the process for reproduction is ended.

In the case where the external recording medium 160 is an authorized external recording medium 160 (Yes in Step 403), the user selects the content to be viewed, and determines the content to be viewed by inputting the instruction for specifying the content using the user interface in the video recording reproduction device 1130 (Step 1101). To simplify the explanation, the content determined by the user is assumed to be the content recorded on the external recording medium 160.

Next, the video recording reproduction device 1130 obtains the unique information of the external recording medium 160 (Steps 407, 408, and 409). This procedure is identical to Steps 407, 408, and 409 in FIG. 4.

Next, the video recording reproduction device 1130 requests the external recording medium 160 to transmit the reproduction disabled content compressed data B, which is the data determined in Step 1101 (Step 1102). The external recording medium 160 transmits the reproduction disabled content compressed data B to the video recording reproduction device 1130 according to the request (Step 1103), and the video recording reproduction device 1130 receives the reproduction disabled content compressed data B (Step 1104).

The video recording reproduction device 1130 confirms whether or not the received reproduction disabled content compressed data B and the reproduction disabled content compressed data AN are created from the identical content based on the identical content confirming information generated in Step 903 (Step 1105). In other words, the encoding/decoding processing unit 117 of the video recording reproduction device 1130 confirms whether or not the contents of the received reproduction disabled content compressed data B and reproduction disabled content compressed data AN are identical based on the identical content confirming information (Step 1105).

In the case where the details of the reproduction disabled content compressed data B is confirmed to be identical to the details of the reproduction disabled content compressed data AN (Yes in Step 1106), the video recording reproduction device 1130 is judged to be identical to the recording/reproduction device 110. In that case, the video recording reproduction device 1130 selects the reproduction disabled content compressed data AN as a content to be actually reproduced (Step 1107).

On the other hand, in the case where the details of the reproduction disabled content compressed data B are not confirmed to be identical to the details of the reproduction disabled content compressed data AN (No in Step 1106), it can be judged that the video recording reproduction device 1130 is the recording/reproduction device different from the recording/reproduction device 110 or that the reproduction disabled content compressed data AN does not exist in the video recording reproduction device 1130 even though the video recording reproduction device 1130 is the recording/reproduction device 110. In that case, the video recording reproduction device 1130 selects the reproduction disabled content compressed data B as the content to be actually reproduced (Step 1108).

The video recording reproduction device 1130 activates the selected reproduction disabled content compressed data AN or the reproduction disabled content compressed data B by using the unique information of the external recording medium 160 obtained beforehand, using the encoding/decoding processing unit 117, which is provided internally (Step 1109). When it cannot be activated (No in Step 1110), the reproduction process is ended. In this case, the unique information of the external recording medium 160 used to create the selected reproduction disabled content compressed data AN or the reproduction disabled content compressed data B can be different from the unique information of the external recording medium used to activate the selected reproduction disabled content compressed data AN or the reproduction disabled content compressed data B. The unique information of the external recording medium is recorded on the ROM area 164 and is not rewritable. Thus, there is a strong possibility that the external recording medium explained in FIG. 11 is different from the external recording medium explained in FIG. 9. This is a problem arising in the case where the content of the external recording medium 160 is copied into the external recording medium, and contradicts the copyright protection. Since the unique information of the external recording medium 160 is used when disabling the content for reproduction, the unique information is required when activating the content. Thus, the content cannot be reproduced even though it is copied, and this serves as protection for copying.

When one of the reproduction disabled content compressed data AN selected in Step 1107 or Step 1108 and the reproduction disabled content compressed data B is activated (Yes in Step 1110), the procedure for reproduction is continued. The video recording reproduction device 1130 decompresses the selected reproduction disabled content compressed data AN or the reproduction disabled content compressed data B by the compression/decompression unit 114, creates and reproduces the video data and audio data (Steps 306, 307, and 308). The reproduction process is identical to Steps 306, 307, and 308 in FIG. 3.

As described above, in the second embodiment, in the case where the details of the reproduction disabled content compressed data B are confirmed to be identical to the details of the reproduction disabled content compressed data AN, the reproduction disabled content compressed data AN is reproduced. In addition, the reproduction disabled content compressed data B is not deleted from the external recording medium 160.

It is assumed that all details of the content compressed data A is reproduced after being recorded onto the external recording medium 160 while degrading an image quality and a sound quality, keeping only a part of the details of the content compressed data A in a state in which it is disabled for reproduction.

In this case, according to the second embodiment, when the part of the details of the content compressed data A disabled for reproduction is confirmed to be identical to the details of the content of the data recorded on the external recording medium 160, a part of the details of the content compressed data A disabled for reproduction is reproduced. Therefore, all of the details of the content compressed data A is reproduced in the same high image quality and high sound quality as a whole. In other words, the quality of the content to be reproduced is consistent.

Furthermore, the data recorded on the external recording medium 160 is not deleted. In order to reproduce all of the details of the content compressed data A after recording only a part of the details of the content compressed data A onto the external recording medium 160 degrading its image quality and sound quality, a method to move the data recorded on the external recording medium 160 to the source recording medium is suggested. In this case, when the move is performed, the data recorded on the external recording medium 160 no longer exist in the external recording medium 160. However, according to the second embodiment, the data recorded on the external recording medium 160 is not deleted. Thus, it is possible to eliminate the time to record the data recorded onto the external recording medium 160 again for retaining the same data in the external recording medium 160. In other words, it is unnecessary for a user to wait the process of re-storing the same data into the external recording medium 160.

As such, even when the part of the details of the content compressed data A is recorded onto the external recording medium 160, the content compressed data A is reproduced in the same high image quality and high sound quality as a whole. In addition, even in the case where all of the details of the content compressed data A is reproduced, the process of recording the same data onto the external recording medium 160 becomes unnecessary when retaining the data recorded on the external recording medium 160 therein.

Note that, a part of or all of the tuner 111, demodulator 112, TS decoder 113, compression/decompression unit 114, recording area 115, reproduction processing unit 116, encoding/decoding processing unit 117, ROM area 118, and communication processing unit 119, which configures the recording/reproduction device 110 according to the first and second embodiments stated above, can be realized by an integrated circuit (an integrated chip).

Industrial Applicability

The recording/reproduction device according to the present invention is useful in the case where a user, after storing the content of the digital TV broadcast in the recording/reproduction device, stores the content in an external recording medium with its image quality and sound quality degraded and views it on a portable terminal device, then views the content at home again in high image quality and high sound quality. Specifically, the recording/reproduction device according to the present invention is useful as a device for providing the digital content under the copyright protection, which is recorded on the external recording medium, in high image quality and high sound quality protecting the copyright of its content.

The invention claimed is:

1. A recording and reproduction device comprising:
 a recording unit including a processor operable to record content onto a first recording medium;
 an output unit including a processor operable to output related content onto a second recording medium, the related content including details identical to details of the content recorded onto the first recording medium;
 a unique information obtaining unit including a processor operable to obtain unique information of the second recording medium;
 a first state changing unit including a processor operable to change a state of the content recorded onto the first recording medium into a state in which the content cannot be played back from the first recording medium unless the unique information is obtained from the second recording medium, by using the unique information of the second recording medium, said first changing unit changing the state when said output unit outputs the related content onto the second recording medium; and
 a reproduction processing unit including a processor operable to playback, from the first recording medium, the content changed into the state in which the content cannot be played back from the first recording medium unless the unique information is obtained from the second recording medium, said reproduction unit playing back the content having the changed state only when said unique information obtaining unit obtains the unique information of the second recording medium after said first state changing unit has changed the state of the content recorded onto the first recording medium into the state in which the content cannot be played back from the first recording medium unless the unique information is obtained from the second recording medium,
 wherein the recording and reproduction device further includes a determination unit including a processor operable to determine whether or not the related content has been recorded onto the second recording medium,
 wherein said unique information obtaining unit is operable to obtain the unique information of the second recording medium when said determination unit determines that the related content has been recorded onto the second recording medium, after said first state changing unit has changed the state of the content recorded onto the first recording medium,
 wherein said output unit is operable to output information regarding unique information of said recording and reproduction device, when said output unit outputs the related content onto the second recording medium, such that the related content and the information regarding the unique information of said recording and reproduction device are recorded onto the second recording medium, and
 wherein said determination unit is operable to determine that the related content has been recorded onto the second recording medium, when the information regarding the unique information of said recording and reproduction device is recorded onto the second recording medium.

2. The recording and reproduction device according to claim 1, further comprising the first recording medium.

3. The recording and reproduction device according to claim 1, further comprising a second state changing unit including a processor operable to change a state of the related content recorded onto the second recording medium in which the related content cannot be played back from the second recording medium when said reproduction unit plays back the content recorded onto the first recording medium and the related content is recorded onto the second recording medium.

4. The recording and reproduction device according to claim 1, further comprising a deleting unit including a processor operable to delete the unique information of the second recording medium after said first state changing unit has changed the state of the content recorded onto the first recording medium.

5. The recording and reproduction device according to claim 1,
wherein a recording history of the related content is further recorded onto the second recording medium, and
wherein said determination unit is operable to determine that the related content has been recorded onto the second recording medium, when the recording history of the related content has been recorded onto the second recording medium.

6. The recording and reproduction device according to claim 1, wherein the content recorded onto the first recording medium is high quality content and the related content recorded onto the second recording medium is low quality content, such that a quality of the high quality content is higher than a quality of the low quality content.

7. A recording and reproduction device comprising:
a recording unit including a processor operable to record content onto a first recording medium;
an output unit including a processor operable to output related content onto a second recording medium, the related content including details identical to details of the content recorded onto the first recording medium;
a unique information obtaining unit including a processor operable to obtain unique information of the second recording medium;
a first state changing unit including a processor operable to change a state of the content recorded onto the first recording medium into a state in which the content cannot be played back from the first recording medium unless the unique information is obtained from the second recording medium, by using the unique information of the second recording medium, said first changing unit changing the state when said output unit outputs the related content onto the second recording medium; and
a reproduction processing unit including a processor operable to playback, from the first recording medium, the content changed into the state in which the content cannot be played back from the first recording medium unless the unique information is obtained from the second recording medium, said reproduction unit playing back the content having the changed state only when said unique information obtaining unit obtains the unique information of the second recording medium after said first state changing unit has changed the state of the content recorded onto the first recording medium into the state in which the content cannot be played back from the first recording medium unless the unique information is obtained from the second recording medium,
wherein the recording and reproduction device further includes a content matching confirmation unit including a processor operable to confirm whether or not details of the content having the changed state are identical to the details of the related content recorded onto the second recording medium, and
wherein said reproduction unit is operable to playback, from the first recording medium, the content having the changed state, when the content matching confirmation unit confirms that the details of the content having the changed state and recorded onto the first recording medium are identical to the details of the related content recorded onto the second recording medium.

8. An integrated circuit comprising:
a recording unit including a processor operable to record content onto a first recording medium;
an output unit including a processor operable to output related content onto a second recording medium, the related content including details identical to details of the content recorded onto the first recording medium;
a unique information obtaining unit including a processor operable to obtain unique information of the second recording medium;
a state changing unit including a processor operable to change a state of the content recorded onto the first recording medium into a state in which the content cannot be played back from the first recording medium unless the unique information is obtained from the second recording medium, by using the unique information of the second recording medium, said first changing unit changing the state when said output unit outputs the related content onto the second recording medium; and
a reproduction processing unit including a processor operable to playback, from the first recording medium, the content changed into the state in which the content cannot be played back from the first recording medium unless the unique information is obtained from the second recording medium, said reproduction unit playing back the content having the changed state only when said unique information obtaining unit obtains the unique information of the second recording medium after said first state changing unit has changed the state of the content recorded onto the first recording medium into the state in which the content cannot be played back from the first recording medium unless the unique information is obtained from the second recording medium,
wherein the integrated circuit further includes a determination unit including a processor operable to determine whether or not the related content has been recorded onto the second recording medium,
wherein said unique information obtaining unit is operable to obtain the unique information of the second recording medium when said determination unit determines that the related content has been recorded onto the second recording medium, after said state changing unit has changed the state of the content recorded onto the first recording medium,
wherein said output unit is operable to output information regarding unique information of the integrated circuit, when said output unit outputs the related content onto the second recording medium, such that the related content and the information regarding the unique information of the integrated circuit are recorded onto the second recording medium, and
wherein said determination unit is operable to determine that the related content has been recorded onto the second recording medium, when the information regarding the unique information of the integrated circuit is recorded onto the second recording medium.

9. A recording and reproduction method of using a recording and reproduction device, the recording and reproduction method comprising:
  a recording step of recording content onto a first recording medium;
  an output step of outputting related content onto a second recording medium, the related content including details identical to details of the content recorded onto the first recording medium;
  a unique information obtaining step of obtaining unique information of the second recording medium;
  a state changing step of changing a state of the content recorded onto the first recording medium into a state in which the content cannot be played back from the first recording medium unless the unique information is obtained from the second recording medium, by using the unique information of the second recording medium, said state changing step changing the state when said output step outputs the related content onto the second recording medium; and
  a reproduction step of playing back, from the first recording medium, the content changed into the state in which the content cannot be played back from the first recording medium unless the unique information is obtained from the second recording medium, said reproduction step playing back the content having the changed state only when said unique information obtaining step obtains the unique information of the second recording medium after said state changing step has changed the state of the content recorded onto the first recording medium into the state in which the content cannot be played back from the first recording medium unless the unique information is obtained from the second recording medium,
  wherein the recording and reproduction method further includes a determination step of determining whether or not the related content has been recorded onto the second recording medium,
  wherein said unique information obtaining step obtains the unique information of the second recording medium when said determination step determines that the related content has been recorded onto the second recording medium, after said state changing step has changed the state of the content recorded onto the first recording medium,
  wherein said output step outputs information regarding unique information of the recording and reproduction device, when said output step outputs the related content onto the second recording medium, such that the related content and the information regarding the unique information of the recording and reproduction device are recorded onto the second recording medium, and
  wherein said determination step determines that the related content has been recorded onto the second recording medium, when the information regarding the unique information of the recording and reproduction device is recorded onto the second recording medium.

10. A non-transitory computer-readable recording medium having a program recorded thereon, the program causing a computer to execute a recording and reproduction method of using a recording and reproduction device, the reproducing and recording method comprising:
  a recording step of recording content onto a first recording medium;
  an output step of outputting related content onto a second recording medium, the related content including details identical to details of the content recorded onto the first recording medium;
  a unique information obtaining step of obtaining unique information of the second recording medium;
  a state changing step of changing a state of the content recorded onto the first recording medium into a state in which the content cannot be played back from the first recording medium unless the unique information is obtained from the second recording medium, by using the unique information of the second recording medium, said state changing step changing the state when said output step outputs the related content onto the second recording medium; and
  a reproduction step of playing back, from the first recording medium, the content changed into the state in which the content cannot be played back from the first recording medium unless the unique information is obtained from the second recording medium, said reproduction step playing back the content having the changed state only when said unique information obtaining step obtains the unique information of the second recording medium after said state changing step has changed the state of the content recorded onto the first recording medium into the state in which the content cannot be played back from the first recording medium unless the unique information is obtained from the second recording medium,
  wherein the recording and reproduction method further includes a determination step of determining whether or not the related content has been recorded onto the second recording medium,
  wherein said unique information obtaining step obtains the unique information of the second recording medium when said determination step determines that the related content has been recorded onto the second recording medium, after said state changing step has changed the state of the content recorded onto the first recording medium,
  wherein said output step outputs information regarding unique information of the recording and reproduction device, when said output step outputs the related content onto the second recording medium, such that the related content and the information regarding the unique information of the recording and reproduction device are recorded onto the second recording medium, and
  wherein said determination step determines that the related content has been recorded onto the second recording medium, when the information regarding the unique information of the recording and reproduction device is recorded onto the second recording medium.

11. An integrated circuit comprising:
  a recording unit including a processor operable to record content onto a first recording medium;
  an output unit including a processor operable to output related content onto a second recording medium, the related content including details identical to details of the content recorded onto the first recording medium;
  a unique information obtaining unit including a processor operable to obtain unique information of the second recording medium;
  a state changing unit including a processor operable to change a state of the content recorded onto the first recording medium into a state in which the content cannot be played back from the first recording medium unless the unique information is obtained from the second recording medium, by using the unique information of the second recording medium, said first changing unit changing the state when said output unit outputs the related content onto the second recording medium; and a reproduction processing unit including a processor operable to playback, from the first recording medium, the content changed into the state in which the content cannot be played back from the first recording medium unless the unique information is obtained from the second recording medium, said reproduction unit playing back the content having the changed state only when said unique information obtaining unit obtains the unique information of the second recording medium after said first state changing unit has changed the state of the content recorded onto the first recording medium into the state in which the content cannot be played back from the first recording medium unless the unique information is obtained from the second recording medium, wherein the integrated circuit further includes a content matching confirmation unit including a processor operable to confirm whether or not details of the content having the changed state are identical to the details of the related content recorded onto the second recording medium, and wherein said reproduction unit is operable to playback, from the first recording medium, the content having the changed state, when the content matching confirmation unit confirms that the details of the content having the changed state and recorded onto the first recording medium are identical to the details of the related content recorded onto the second recording medium.

12. A recording and reproduction method of using a recording and reproduction device, the recording and reproduction method comprising:

a recording step of recording content onto a first recording medium;

an output step of outputting related content onto a second recording medium, the related content including details identical to details of the content recorded onto the first recording medium;

a unique information obtaining step of obtaining unique information of the second recording medium;

a state changing step of changing a state of the content recorded onto the first recording medium into a state in which the content cannot be played back from the first recording medium unless the unique information is obtained from the second recording medium, by using the unique information of the second recording medium, said state changing step changing the state when said output step outputs the related content onto the second recording medium; and a reproduction step of playing back, from the first recording medium, the content changed into the state in which the content cannot be played back from the first recording medium unless the unique information is obtained from the second recording medium, said reproduction step playing back the content having the changed state only when said unique information obtaining step obtains the unique information of the second recording medium after said state changing step has changed the state of the content recorded onto the first recording medium into the state in which the content cannot be played back from the first recording medium unless the unique information is obtained from the second recording medium, wherein said recording and reproduction method further includes a content matching confirmation step of confirming whether or not details of the content having the changed state are identical to the details of the related content recorded onto the second recording medium, and wherein said reproduction step plays back, from the first recording medium, the content having the changed state, when the content matching confirmation step confirms that the details of the content having the changed state and recorded onto the first recording medium are identical to the details of the related content recorded onto the second recording medium.

13. A non-transitory computer-readable recording medium having a program recorded thereon, the program causing a computer to execute a recording and reproduction method of using a recording and reproduction device, the recording and reproduction method comprising:

a recording step of recording content onto a first recording medium;

an output step of outputting related content onto a second recording medium, the related content including details identical to details of the content recorded onto the first recording medium;

a unique information obtaining step of obtaining unique information of the second recording medium;

a state changing step of changing a state of the content recorded onto the first recording medium into a state in which the content cannot be played back from the first recording medium unless the unique information is obtained from the second recording medium, by using the unique information of the second recording medium, said state changing step changing the state when said output step outputs the related content onto the second recording medium; and a reproduction step of playing back, from the first recording medium, the content changed into the state in which the content cannot be played back from the first recording medium unless the unique information is obtained from the second recording medium, said reproduction step playing back the content having the changed state only when said unique information obtaining step obtains the unique information of the second recording medium after said state changing step has changed the state of the content recorded onto the first recording medium into the state in which the content cannot be played back from the first recording medium unless the unique information is obtained from the second recording medium, wherein said recording and reproduction method further includes a content matching confirmation step of confirming whether or not details of the content having the changed state are identical to the details of the related content recorded onto the second recording medium, and wherein said reproduction step plays back, from the first recording medium, the content having the changed state, when the content matching confirmation step confirms that the details of the content having the changed state and recorded onto the first recording medium are identical to the details of the related content recorded onto the second recording medium.

* * * * *